United States Patent
Modi et al.

(10) Patent No.: US 9,885,490 B2
(45) Date of Patent: *Feb. 6, 2018

(54) HEATING CONTROLS AND METHODS FOR AN ENVIRONMENTAL CONTROL SYSTEM

(71) Applicant: Google Inc., Mountain View, CA (US)

(72) Inventors: Yash Modi, Foster City, CA (US); Yoky Matsuoka, Palo Alto, CA (US); Mark Malhotra, San Mateo, CA (US)

(73) Assignee: Google LLC, Mountain View, CA (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/596,059

(22) Filed: Jan. 13, 2015

(65) Prior Publication Data

US 2015/0134122 A1    May 14, 2015

Related U.S. Application Data

(63) Continuation of application No. 14/085,594, filed on Nov. 20, 2013, now Pat. No. 8,965,587, which is a
(Continued)

(51) Int. Cl.
    G06F 19/00    (2011.01)
    F24F 11/00    (2006.01)
    (Continued)

(52) U.S. Cl.
    CPC ........ *F24F 11/006* (2013.01); *F24F 11/0012* (2013.01); *G05B 13/04* (2013.01);
    (Continued)

(58) Field of Classification Search
    USPC ....................................................... 700/276
    See application file for complete search history.

(56) References Cited

U.S. PATENT DOCUMENTS

| | | |
|---|---|---|
| 3,991,357 A | 11/1976 | Kaminski |
| 4,183,290 A | 1/1980 | Kucharczyk |

(Continued)

FOREIGN PATENT DOCUMENTS

| | | |
|---|---|---|
| CA | 2202008 | 2/2000 |
| CN | 1145113 A | 3/1997 |

(Continued)

OTHER PUBLICATIONS

Chinese First Office Action dated Mar. 2, 2016, for Chinese Patent Application No. 2016022601306350, 10 pages.
(Continued)

*Primary Examiner* — Kidest Bahta
(74) *Attorney, Agent, or Firm* — Kilpatrick Townsend & Stockton LLP

(57) ABSTRACT

Embodiments of the invention describe thermostats that use model predictive controls and related methods. A method of controlling a thermostat using a model predictive control may involve determining a parameterized model. The parameterized model may be used to predicted ambient temperature values for an enclosure. A set of radiant heating system control strategies may be selected for evaluation to determine an optimal control strategy from the set of control strategies. To determine the optimal control strategy, a predictive algorithm may be executed, in which each control strategy is applied to the parameterized model to predict an ambient temperature trajectory and each ambient temperature trajectory is processed in view of a predetermined assessment function. Processing the ambient temperature trajectory in this manner may involve minimizing a cost value associated with the ambient temperature trajectory. The radiant heating system may subsequently be controlled according to the selected optimal control strategy.

30 Claims, 18 Drawing Sheets

Related U.S. Application Data continuation of application No. 13/632,152, filed on Sep. 30, 2012, now Pat. No. 8,600,561.

(51) Int. Cl.
  *G05D 23/19* (2006.01)
  *G05B 13/04* (2006.01)
  *G06N 5/04* (2006.01)

(52) U.S. Cl.
  CPC ......... *G05D 23/19* (2013.01); *G05D 23/1919* (2013.01); *G06N 5/048* (2013.01); *F24F 2011/0063* (2013.01)

(56) References Cited

U.S. PATENT DOCUMENTS

| | | | |
|---|---|---|---|
| 4,223,831 A | 9/1980 | Szarka | |
| 4,335,847 A | 6/1982 | Levine | |
| 4,408,711 A | 10/1983 | Levine | |
| 4,615,380 A | 10/1986 | Beckey | |
| 4,669,654 A | 6/1987 | Levine et al. | |
| 4,674,027 A | 6/1987 | Beckey | |
| 4,685,614 A | 8/1987 | Levine | |
| 4,751,961 A | 6/1988 | Levine et al. | |
| 4,897,798 A | 1/1990 | Cler | |
| 4,916,909 A * | 4/1990 | Mathur | F24F 11/00 165/236 |
| 4,971,136 A | 11/1990 | Mathur et al. | |
| 5,088,645 A | 2/1992 | Bell | |
| 5,170,935 A * | 12/1992 | Federspiel | F24F 11/0009 236/44 C |
| 5,211,332 A | 5/1993 | Adams | |
| 5,240,178 A | 8/1993 | Dewolf et al. | |
| 5,244,146 A | 9/1993 | Jefferson et al. | |
| 5,395,042 A | 3/1995 | Riley et al. | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,673,850 A | 10/1997 | Uptegraph | |
| 5,808,294 A | 9/1998 | Neumann | |
| 5,902,183 A | 5/1999 | D'Souza | |
| 5,909,378 A | 6/1999 | De Milleville | |
| 5,918,474 A | 7/1999 | Khanpara et al. | |
| 5,977,964 A | 11/1999 | Williams et al. | |
| 6,062,482 A | 5/2000 | Gauthier et al. | |
| 6,066,843 A | 5/2000 | Scheremeta | |
| 6,072,784 A | 6/2000 | Agrawal et al. | |
| 6,095,427 A | 8/2000 | Hoium et al. | |
| 6,098,893 A | 8/2000 | Berglund et al. | |
| 6,216,956 B1 | 4/2001 | Ehlers et al. | |
| 6,349,883 B1 | 2/2002 | Simmons et al. | |
| 6,356,204 B1 | 3/2002 | Guindi et al. | |
| 6,370,894 B1 | 4/2002 | Thompson et al. | |
| 6,415,205 B1 | 7/2002 | Myron et al. | |
| 6,478,233 B1 | 11/2002 | Shah | |
| 6,645,066 B2 | 11/2003 | Gutta et al. | |
| 6,769,482 B2 | 8/2004 | Wagner et al. | |
| 6,785,592 B1 * | 8/2004 | Smith | G06Q 50/06 700/291 |
| 6,990,821 B2 | 1/2006 | Singh et al. | |
| 7,024,336 B2 | 4/2006 | Salsbury et al. | |
| 7,149,727 B1 | 12/2006 | Nicholls et al. | |
| 7,149,729 B2 | 12/2006 | Kaasten et al. | |
| 7,188,482 B2 | 3/2007 | Sadegh et al. | |
| 7,379,791 B2 | 5/2008 | Tamarkin et al. | |
| RE40,437 E | 7/2008 | Rosen | |
| 7,469,550 B2 | 12/2008 | Chapman, Jr. et al. | |
| 7,644,869 B2 | 1/2010 | Hoglund et al. | |
| 7,667,163 B2 | 2/2010 | Ashworth et al. | |
| 7,702,424 B2 | 4/2010 | Cannon et al. | |
| 7,784,704 B2 | 8/2010 | Harter | |
| 7,802,618 B2 | 9/2010 | Simon et al. | |
| 7,848,900 B2 | 12/2010 | Steinberg et al. | |
| 7,849,698 B2 | 12/2010 | Harrod et al. | |
| 7,854,389 B2 | 12/2010 | Ahmed | |
| 8,010,237 B2 | 8/2011 | Cheung et al. | |
| 8,019,567 B2 | 9/2011 | Steinberg et al. | |
| 8,037,022 B2 | 10/2011 | Rahman et al. | |
| 8,090,477 B1 | 1/2012 | Steinberg | |
| 8,091,375 B2 | 1/2012 | Crawford | |
| 8,131,497 B2 | 3/2012 | Steinberg et al. | |
| 8,174,381 B2 | 5/2012 | Imes et al. | |
| 8,180,492 B2 | 5/2012 | Steinberg | |
| 8,219,249 B2 | 7/2012 | Harrod et al. | |
| 8,600,561 B1 | 12/2013 | Modi et al. | |
| 2004/0034484 A1 * | 2/2004 | Solomita, Jr. | H02J 3/14 702/62 |
| 2004/0249479 A1 | 12/2004 | Shorrock | |
| 2005/0090915 A1 | 4/2005 | Geiwitz | |
| 2005/0128067 A1 | 6/2005 | Zakrewski | |
| 2005/0150968 A1 | 7/2005 | Shearer | |
| 2005/0189429 A1 | 9/2005 | Breeden | |
| 2005/0192915 A1 | 9/2005 | Ahmed et al. | |
| 2005/0280421 A1 | 12/2005 | Yomoda et al. | |
| 2006/0186214 A1 | 8/2006 | Simon et al. | |
| 2006/0196953 A1 | 9/2006 | Simon et al. | |
| 2007/0045431 A1 | 3/2007 | Chapman, Jr. et al. | |
| 2007/0115902 A1 | 5/2007 | Shamoon et al. | |
| 2007/0205297 A1 | 9/2007 | Finkam et al. | |
| 2008/0015742 A1 | 1/2008 | Kulyk et al. | |
| 2008/0183335 A1 | 7/2008 | Poth et al. | |
| 2008/0191045 A1 | 8/2008 | Harter | |
| 2008/0273754 A1 | 11/2008 | Hick et al. | |
| 2008/0317292 A1 | 12/2008 | Baker et al. | |
| 2009/0012959 A1 | 1/2009 | Ylivainio et al. | |
| 2009/0171862 A1 | 7/2009 | Harrod et al. | |
| 2009/0254225 A1 | 10/2009 | Boucher et al. | |
| 2009/0259713 A1 | 10/2009 | Blumrich et al. | |
| 2009/0297901 A1 | 12/2009 | Kilian et al. | |
| 2009/0327354 A1 | 12/2009 | Resnick et al. | |
| 2010/0004790 A1 * | 1/2010 | Harbin | F24D 19/1051 700/291 |
| 2010/0019051 A1 | 1/2010 | Rosen | |
| 2010/0025483 A1 | 2/2010 | Hoeynck et al. | |
| 2010/0050004 A1 | 2/2010 | Hamilton et al. | |
| 2010/0070084 A1 | 3/2010 | Steinberg et al. | |
| 2010/0070086 A1 | 3/2010 | Harrod et al. | |
| 2010/0070089 A1 | 3/2010 | Harrod et al. | |
| 2010/0070234 A1 | 3/2010 | Steinberg et al. | |
| 2010/0084482 A1 | 4/2010 | Kennedy et al. | |
| 2010/0167783 A1 | 7/2010 | Alameh et al. | |
| 2010/0179704 A1 | 7/2010 | Ozog | |
| 2010/0198425 A1 | 8/2010 | Donovan | |
| 2010/0211224 A1 | 8/2010 | Keeling et al. | |
| 2010/0262298 A1 | 10/2010 | Johnson et al. | |
| 2010/0262299 A1 | 10/2010 | Cheung et al. | |
| 2010/0280667 A1 | 11/2010 | Steinberg | |
| 2010/0289643 A1 | 11/2010 | Trundle et al. | |
| 2010/0308119 A1 | 12/2010 | Steinberg et al. | |
| 2010/0318227 A1 | 12/2010 | Steinberg et al. | |
| 2011/0046792 A1 | 2/2011 | Imes et al. | |
| 2011/0046799 A1 * | 2/2011 | Imes | H04L 67/42 700/286 |
| 2011/0046805 A1 * | 2/2011 | Bedros | H04L 12/2809 700/291 |
| 2011/0046806 A1 | 2/2011 | Nagel et al. | |
| 2011/0077758 A1 | 3/2011 | Tran et al. | |
| 2011/0077896 A1 | 3/2011 | Steinberg et al. | |
| 2011/0151837 A1 | 6/2011 | Winbush | |
| 2011/0160913 A1 | 6/2011 | Parker et al. | |
| 2011/0185895 A1 | 8/2011 | Freen | |
| 2011/0307103 A1 | 12/2011 | Cheung et al. | |
| 2011/0307112 A1 | 12/2011 | Barrilleaux | |
| 2012/0005590 A1 | 1/2012 | Lombard et al. | |
| 2012/0017611 A1 | 1/2012 | Coffel et al. | |
| 2012/0065935 A1 | 3/2012 | Steinberg et al. | |
| 2012/0085831 A1 | 4/2012 | Kopp | |
| 2012/0101637 A1 | 4/2012 | Imes et al. | |
| 2012/0158350 A1 | 6/2012 | Steinberg et al. | |
| 2012/0221151 A1 | 8/2012 | Steinberg | |

(56) References Cited

U.S. PATENT DOCUMENTS

| | | | |
|---|---|---|---|
| 2012/0252430 A1 | 10/2012 | Imes et al. | |
| 2013/0030600 A1* | 1/2013 | Shetty | F24F 11/006 700/300 |

FOREIGN PATENT DOCUMENTS

| | | |
|---|---|---|
| CN | 101111721 A | 1/2008 |
| EP | 196069 | 12/1991 |
| JP | 59106311 | 6/1984 |
| JP | 01252850 | 10/1989 |
| WO | 2012/068591 A2 | 5/2012 |
| WO | 2014055059 | 4/2014 |

OTHER PUBLICATIONS

Extended European Search Report dated May 13, 2016, for European Patent Application No. 12885946.9, 7 pages.
International Search Report and Written Opinion dated Dec. 27, 2012 for International Patent Application No. PCT/US2012/058211 filed Oct. 1, 2012, all pages.
International Preliminary Report on Patentability dated Apr. 16, 2015 for International Patent Application No. PCT/US2012/058211 filed Oct. 1, 2012, all pages.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], , ], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from the Internet: <URL: http://www.homenetworkenabled.com/content.php?136-ecobee-WiFi-enabled-Smart-Thermostat-Part-2-The-Feature-review> [retrieved on Jan. 8, 2013], Dec. 2, 2011, 5 pages.
Gao et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos et al., "Buildings End-Use Energy Efficiency: Alternatives to Compressor Cooling", California Energy Commission, Public Interest Energy Research, Jan. 2000, 80 pages.
Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
U.S. Appl. No. 13/632,152, Non Final Office Action dated Jan. 4, 2013, 6 pages.

(56) References Cited

OTHER PUBLICATIONS

U.S. Appl. No. 13/632,152, Notice of Allowance dated Aug. 1, 2013, all pages.

* cited by examiner

HEATING CONTROLS AND METHODS FOR AN ENVIRONMENTAL CONTROL SYSTEM

CROSS-REFERENCES TO RELATED APPLICATIONS

This application is a continuation of U.S. patent application Ser. No. 14/085,594, filed Nov. 20, 2013, entitled "RADIANT HEATING CONTROLS AND METHODS FOR AN ENVIRONMENTAL CONTROL SYSTEM," which is a continuation of U.S. patent application Ser. No. 13/632,152, filed Sep. 30, 2012, entitled "RADIANT HEATING CONTROLS AND METHODS FOR AN ENVIRONMENTAL CONTROL SYSTEM," the entire disclosure of which is hereby incorporated by reference for all purposes, as if fully set forth herein.

TECHNICAL FIELD

This patent specification relates to systems and methods for controlling heating systems to minimize overshooting and undershooting effects. More particularly, this patent specification relates to control units that govern the operation of energy-consuming systems, household devices, or other resource-consuming systems, including systems and methods for controlling heating, ventilation, and air conditioning (HVAC) systems.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. One particular energy inefficient operation involves what is commonly known as "overshooting" and "undershooting" in which, for overshooting, an ambient temperature continues to rise above a setpoint temperature even though the heating operation has been discontinued, while for undershooting, the ambient temperature continues to fall below the setpoint temperature even after the heating operation has been resumed. This problem is particularly evident in radiant heating systems and often results in less than ideal comfort conditions. The overshoot and undershoot are often due to a thermal inertia of a heated enclosure or the amount of mass that is heated. Conventional control systems are limited in their effectiveness in avoiding undesirable overshooting and undershooting effects.

As discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing.

Additionally, microprocessor controlled "intelligent" thermostats may have more advanced environmental control capabilities that can save energy while also keeping occupants comfortable. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Issues arise in relation to providing microprocessor-controlled thermostats using high-powered user interfaces, one or more such issues being at least partially resolved by one or more of the embodiments described herein below. On the one hand, it is desirable to provide a thermostat having advanced functionalities such as those associated with relatively powerful microprocessors and reliable wireless communications chips. On the other hand, it is desirable to provide a thermostat that is compatible and adaptable for installation in a wide variety of homes, including a substantial percentage of homes that are not equipped with the "C" wire discussed above. It is still further desirable to provide such a thermostat that accommodates easy do-it-yourself installation such that the expense and inconvenience of arranging for an HVAC technician to visit the premises to install the thermostat can be avoided for a large number of users. It is still further desirable to provide a thermostat having such processing power, wireless communications capabilities, visually pleasing display qualities, and other advanced functionalities, while also being a thermostat that, in addition to not requiring a "C" wire, likewise does not need to be plugged into a household line current or a so-called "power brick," which can be inconvenient for the particular location of the thermostat as well as unsightly. Therefore, improvements are needed in the art.

Important issues arise, moreover, at the interface between (i) energy-saving technologies that might be achievable using known sensing and processing methods, and (ii) the actual widespread user adoption of devices that implement such energy-saving technologies and the integration of those devices into their daily routines and environment. It has been found especially important that the contact between a user and an energy-saving device, which for the case of a thermostat would include both (i) the quality and enjoyability of the user experience when interfacing with the thermostat, as well as (ii) the physical comfort provided by the way in which the ambient temperature is controlled by the thermostat, constitute a particularly pleasant experience, or else the user can quickly "turn off" or "tune out" to the device and its energy-saving advantages, such as by de-activating the advanced features (for example, setting their thermostat to a "temporary" manual-override mode on a permanent basis) or even taking it back to the seller and replacing it with their old device or a "less complicated" device. One or more issues arises in the context of providing an intelligent, multi-sensing, network-connected, energy-saving device, including a device that intelligently controls radiant heating systems, that provides a pleasant user overall user experience including effective and appropriate control of ambient temperature. Other issues arise as would be apparent to a person skilled in the art in view of the present teachings.

BRIEF SUMMARY OF THE INVENTION

Embodiments of the invention describe devices, systems, and method using predictive controls to condition an enclosure, such as a home. Such controls may enhance the functionality of HVAC systems, especially when used with radiant heating systems. According to one aspect, a thermostat is described herein. The thermostat includes a housing, a memory, and a processing system disposed within the housing. The processing system may be in operative communication with one or more temperature sensors to determine an ambient temperature in an enclosure and may be in operative communication with the memory. The processing system may also be in operative communication with a radiant heating system to heat the enclosure via radiant heating so that the ambient temperature is near a setpoint temperature.

In one embodiment, the processing system may determine a parameterized model from which a predicted value for the ambient temperature of the enclosure responsive to a candidate radiant heating control strategy is determined. The parameterized model may be based on historical ambient temperatures for the enclosure that are acquired by the thermostat during associated historical periods in which radiant heat control was actuated by the thermostat and stored in the memory. The processing system may also select a set of candidate control strategies for use in controlling the radiant heating system. Each candidate control strategy may be a binary-valued control trajectory having a candidate overall on-time percentage over a predefined candidate control duration. Each candidate control strategy may also be constrained to have a minimum number of on-time cycles that achieves the candidate overall on-time percentage.

The processing system may further execute a predictive algorithm to determine an optimal control strategy from the set of candidate control strategies. According to some embodiments, this determination may be made by applying each candidate control strategy to the parameterized model to predict a corresponding ambient temperature trajectory and processing each corresponding ambient temperature trajectory in view of one or more predetermined assessment functions to select an optimal one of the candidate control strategies according to one or more predetermined assessment criteria. The one or more predetermined assessment functions may include a cost function in which a cost is increased as an ambient temperature trajectory of a respective candidate control strategy deviates from the setpoint temperature. The processing system may further control the radiant heating system according to the selected optimal control strategy.

In some embodiments, each candidate control strategy may exhibit a single on-time to off-time cycle transition over the predefined candidate control duration. In other embodiments, the radiant heating system may not be able to perform an on-time to off-time cycle transition more than twice during the predefined candidate control duration. According to one embodiment, the on-time cycles and off-time cycles may have intervals of not less than 10 minutes. The processing system may additionally determine a Lag value that represents an amount of thermal mass or inertia for the enclosure. The parameterized model may include predetermined response trajectories, wherein weighting coefficients are found or calculated for the predetermined response trajectories.

In some embodiments, the parameterized model is based on a combination of historical solar radiation and a radiant heating response data acquired during associated historical periods. In such embodiments, applying each candidate control strategy to the parameterized model may include using a solar radiation function and a radiant heating response function to predict the corresponding ambient temperature trajectory. The parameterized model may be further based on historical outside temperature data acquired during associated historical periods. In these embodiments, applying each candidate control strategy to the parameterized model may include using forecasted temperature data to predict the corresponding ambient temperature trajectory.

In other embodiments, the parameterized model may be further based on historical data acquired during associated historical periods for one or more of the following data types: seasonal climate change data, humidity data, rainfall data, snowpack data, and/or elevation data. In such embodiments, applying each candidate control strategy to the parameterized model may include using forecasted data or otherwise selected data for the one or more data types to predict the corresponding ambient temperature trajectory.

According to some embodiments, the processing system may limit a cycle transition of the radiant heating system (i.e., either on or off) while the ambient temperature is outside of a defined maintenance band of the setpoint temperature. In another embodiment, the processing system may increase an offset value of a maintenance band that defines an upper threshold temperature and a lower threshold temperature relative to the setpoint temperature. The offset value may be increased based on an increased confidence that the parameterized model characterizes the historical ambient temperatures.

According to another aspect, a method of controlling a thermostat using model predictive control is described herein. According to the method, a thermostat having a housing, a memory, and a processing system disposed within the housing is provided. As described herein, the processing system may be in operative communication with one or more temperature sensors to determine an ambient temperature in an enclosure and may be in operative communication with the memory. The processing system may also be in operative communication with a radiant heating system to heat the enclosure via radiant heating so that the ambient temperature is near a setpoint temperature. According to the method, a parameterized model may be determined from which a predicted value for the ambient temperature of the enclosure responsive to a candidate radiant heating control strategy is determined. The parameterized model may be based on historical ambient temperatures for the enclosure acquired by the thermostat during associated historical periods in which radiant heat control was actuated by the thermostat and stored in the memory.

According to the method, a set of candidate control strategies for use in controlling the radiant heating system may be selected. Each candidate control strategy may be a binary-valued control trajectory having a candidate overall on-time percentage over a predefined candidate control duration. In addition, each candidate control strategy may be constrained to have a minimum number of on-time cycles that achieves the candidate overall on-time percentage. According to the method, a predictive algorithm may be executed to determine an optimal control strategy from the set of candidate control strategies. This determination may be performed by applying each candidate control strategy to the parameterized model to predict a corresponding ambient temperature trajectory and processing each corresponding ambient temperature trajectory in view of one or more predetermined assessment functions to select an optimal one of the candidate control strategies according to one or more predetermined assessment criteria. As described herein, the one or more predetermined assessment functions may include a cost function in which a cost is increased as an ambient temperature trajectory of a respective candidate control strategy deviates from the setpoint temperature. According to the method, the radiant heating system may be controlled according to the selected optimal control strategy.

In some embodiments, it may be determined as to whether the model predictive control provides enhanced control of the radiant heating system relative to an additional control method prior to using the model predictive control. A Lag value may also be calculated, measured, or otherwise determined that represents an amount of thermal mass or inertia for the enclosure. In some embodiments, the on-time cycles and off-time cycles may have intervals of not less than 10 minutes. In some embodiments, the parameterized model may include predetermined response trajectories and the method may additionally include: determining weighting coefficients of the predetermined response trajectories.

As described herein, the parameterized model may be based on a combination of historical solar radiation and a radiant heating response data acquired during associated historical periods. In such embodiments, applying each candidate control strategy to the parameterized model may include using a solar radiation function and a radiant heating response function to predict the corresponding ambient temperature trajectory. In some embodiments, the parameterized model may be further based on historical outside temperature data acquired during associated historical periods. In such embodiments, applying each candidate control strategy to the parameterized model may include using forecasted temperature data to predict the corresponding ambient temperature trajectory.

According to some methods, a cycle transition of the radiant heating system may be limited or restricted while the ambient temperature is outside of a defined maintenance band of the setpoint temperature. According to another method, an offset value of a maintenance band may be adjusted, the offset value defining an upper threshold temperature and a lower threshold temperature relative to the setpoint temperature. The offset value may be adjusted based on a confidence that the parameterized model characterizes the historical ambient temperatures.

According to another aspect, a thermostat is described herein. The thermostat includes a housing, a memory, and a processing system disposed within the housing. The processing system may be configured in operative communication with one or more temperature sensors, the memory, and a radiant heating system for the reasons described above. According to one embodiment, the processing system may determine a parameterized model from which a predicted value for the ambient temperature of the enclosure responsive to a candidate radiant heating control strategy is determined. The parameterized model may be based on historical ambient temperatures for the enclosure acquired by the thermostat during associated historical periods in which radiant heat control was actuated by the thermostat and stored in the memory. A confidence metric may be associated with the parameterized model.

The processing system may also determine a maintenance band for operation of the radiant heating system. The maintenance band may have an offset value that defines an upper threshold temperature and a lower threshold temperature relative to the setpoint temperature. The maintenance band may be used in controlling on-cycle and off-cycle transitions of the radiant heating system. In some embodiments, the offset value may be dependent on the confidence metric of the parameterized model. For example, the offset value may be greater if the confidence metric is large and may be smaller if the confidence metric is small. The processing system may also execute a predictive algorithm to determine an optimal control strategy from a set of candidate control strategies by applying each candidate control strategy to the parameterized model to predict a corresponding ambient temperature trajectory. The processing system may further control the radiant heating system according to the determined optimal control strategy using the maintenance band.

According to one embodiment, each candidate control strategy may be a binary-valued control trajectory having a candidate overall on-time percentage over a predefined candidate control duration. In addition, each candidate control strategy may be constrained to have a minimum number of on-time cycles that achieves the candidate overall on-time percentage. In some embodiment, executing the predictive algorithm may also include processing each corresponding ambient temperature trajectory in view of one or more predetermined assessment functions to select an optimal one of the candidate control strategies according to one or more predetermined assessment criteria.

According to another aspect, a method of controlling a thermostat is described herein. According to the method, a thermostat may be provided that includes a housing, a memory, and a processing system disposed within the housing. The processing system may be in operative communication with one or more temperature sensors, with the memory, and with a radiant heating system for the reasons described above. The method may include determining a first parameterized model from which a predicted value for the ambient temperature of the enclosure responsive to a candidate radiant heating control strategy may be determined. The parameterized model may be associated with a confidence metric. The method may also include determining a maintenance band for operation of the radiant heating system, the maintenance band having an offset value that defines an upper threshold temperature and a lower threshold temperature relative to the setpoint temperature that is used in controlling on-cycle and off-cycle transitions of the radiant heating system.

The method may further include adjusting the offset value based on the confidence metric such that the offset value is greater if the confidence metric is large and smaller if the confidence metric is small. The method may additionally include executing a predictive algorithm to determine an optimal control strategy from a set of candidate control strategies by applying each candidate control strategy to the parameterized model to predict a corresponding ambient temperature trajectory. The method may additionally include controlling the radiant heating system according to the determined optimal control strategy using the first maintenance band.

DETAILED DESCRIPTION OF THE INVENTION

Figure 1:
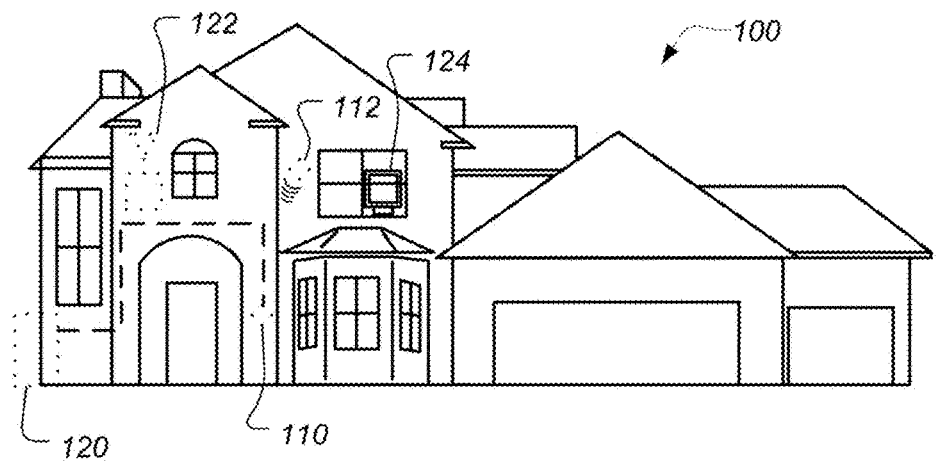
FIG. 1 is a diagram of an enclosure with an HVAC system, according to some embodiments.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

The subject matter of the instant disclosure is related to the subject matter of the following commonly assigned applications, each of which is incorporated by reference herein: U.S. Prov. Ser. No. 61/550,343 filed Oct. 21, 2011; U.S. Prov. Ser. No. 61/550,346 filed Oct. 21, 2011; International Application Ser. No. PCT/US12/00007 filed Jan. 3, 2012; U.S. Ser. No. 13/467,025 filed May 8, 2012; U.S. Ser. No. 13/632,093 filed even date herewith and entitled, "Intelligent Controller For An Environmental Control System"; U.S. Ser. No. 13/632,028 filed Sep. 30, 2012 and entitled, "Intelligent Controller Providing Time to Target State"; U.S. Ser. No. 13/632,041 filed Sep. 30, 2012 and entitled, "Automated Control-Schedule Acquisition Within An Intelligent Controller"; U.S. Ser. No. 13/632,070 filed Sep. 30, 2012 and entitled, "Automated Presence Detection and Presence- Related Control Within An Intelligent Controller"; U.S. Ser. No. 13/632,150 filed Sep. 30, 2012 and entitled, "Preconditioning Controls and Methods For An Environmental Control System"; and U.S. Ser. No. 13/632,148 filed Sep. 30, 2012 and entitled, "HVAC Controller With User-Friendly Installation Features Facilitating Both Do-It-Yourself and Professional Installation Scenarios".

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are systems, methods, computer program products, and related business methods for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, elegant to behold, and delightfully easy to use. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule (see FIG. 10) based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
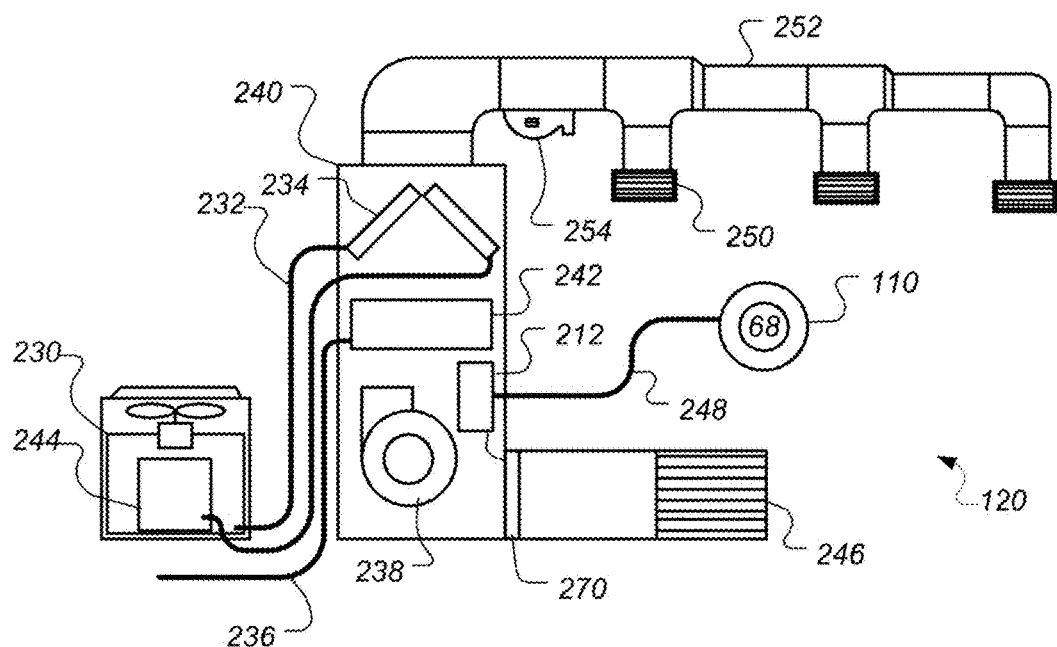
FIG. 2 is a diagram of an HVAC system, according to some embodiments.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools, and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Exemplary Thermostat Embodiments

Figure 3:
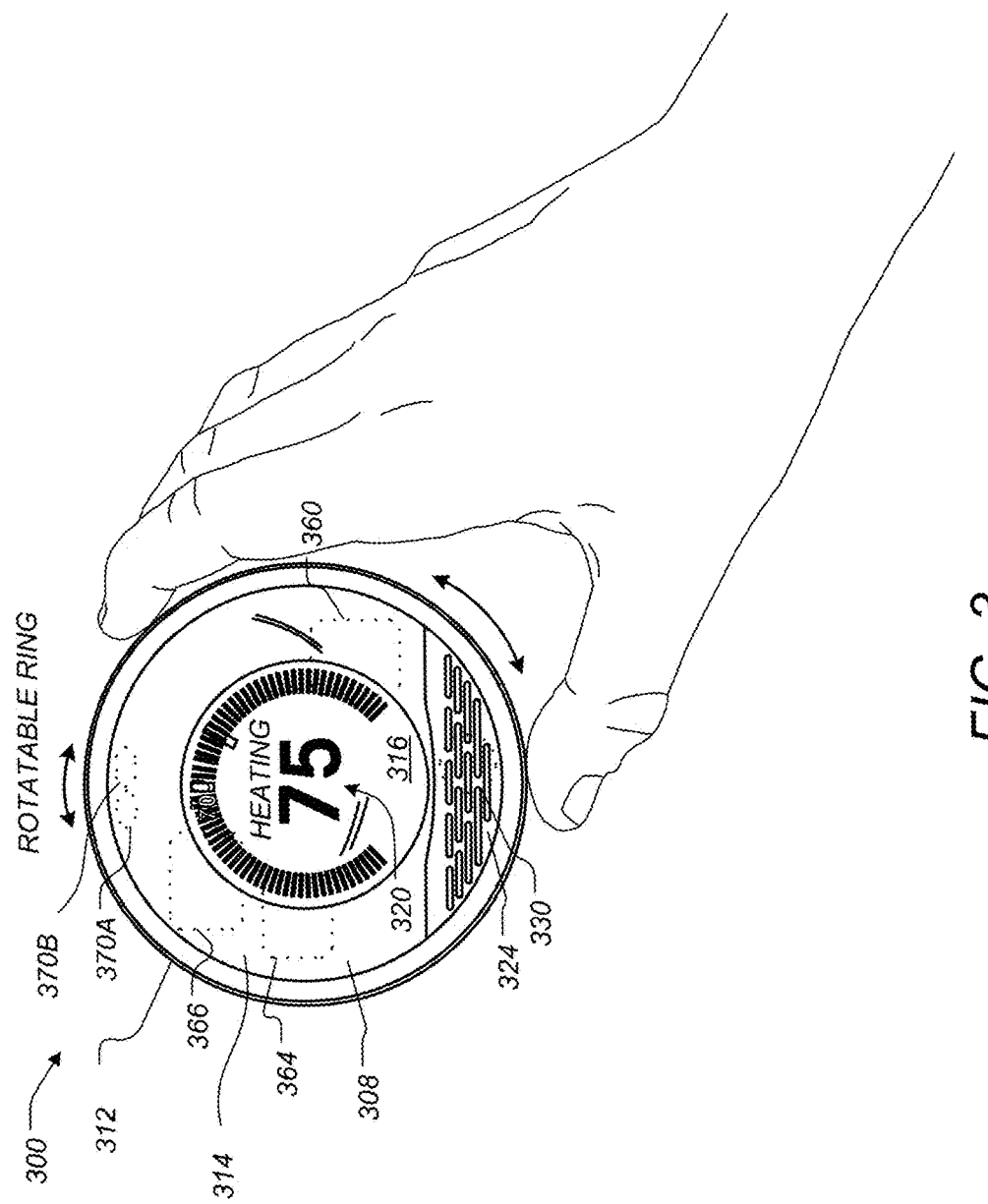
FIG. 3 illustrates a perspective view of a thermostat, according to one embodiment.

FIGS. 3-7 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 3 illustrates a perspective view of a thermostat 300, according to one embodiment. In this specific embodiment, the thermostat 300 can be controlled by at least two types of user input, the first being a rotation of the outer ring 312, and the second being an inward push on an outer cap 308 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 300.

For this embodiment, the outer cap 308 can comprise an assembly that includes the outer ring 312, a cover 314, an electronic display 316, and a metallic portion 324. Each of these elements, or the combination of these elements, may be referred to as a "housing" for the thermostat 300. Simultaneously, each of these elements, or the combination of these elements, may also form a user interface. The user interface may specifically include the electronic display 316. In FIG. 3, the user interface 316 may be said to operate in an active display mode. The active display mode may include providing a backlight for the electronic display 316. In other embodiments, the active display mode may increase the intensity and/or light output of the electronic display 316 such that a user can easily see displayed settings of the thermostat 300, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 316, depending on the embodiment.

Depending on the settings of the thermostat 300, the active display mode and the inactive display mode of the electronic display 316 may also or instead be characterized by the relative power usage of each mode. In one embodiment, the active display mode may generally require substantially more electrical power than the inactive display mode. In some embodiments, different operating modes of the electronic display 316 may instead be characterized completely by their power usage. In these embodiments, the different operating modes of the electronic display 316 may be referred to as a first mode and a second mode, where the user interface requires more power when operating in the first mode than when operating in the second mode.

According to some embodiments the electronic display 316 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 316 may be a backlit color liquid crystal display (LCD). An example of information displayed on the electronic display 316 is illustrated in FIG. 3, and includes central numerals 320 that are representative of a current setpoint temperature. According to some embodiments, metallic portion 324 can have a number of slot-like openings so as to facilitate the use of a sensors 330, such as a passive infrared motion sensor (PIR), mounted beneath the slot-like openings.

According to some embodiments, the thermostat 300 can include additional components, such as a processing system 360, display driver 364, and a wireless communications system 366. The processing system 360 can adapted or configured to cause the display driver 364 to cause the electronic display 316 to display information to the user. The processing system 360 can also be configured to receive user input via the rotatable ring 312. These additional components, including the processing system 360, can be enclosed within the housing, as displayed in FIG. 3. These additional components are described in further detail herein below.

The processing system 360, according to some embodiments, is capable of carrying out the governance of the thermostat's operation. For example, processing system 360 can be further programmed and/or configured to maintain and update a thermodynamic model for the enclosure in which the HVAC system is installed. According to some embodiments, the wireless communications system 366 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy, as is described further in the commonly assigned U.S. Ser. No. 13/632,070, supra. According to some embodiments, occupancy information can be a used in generating an effective and efficient scheduled program. For example, an active proximity sensor 370A can be provided to detect an approaching user by infrared light reflection, and an ambient light sensor 370B can be provided to sense visible light. The proximity sensor 370A can be used in conjunction with a plurality of other sensors to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

Figure 4:
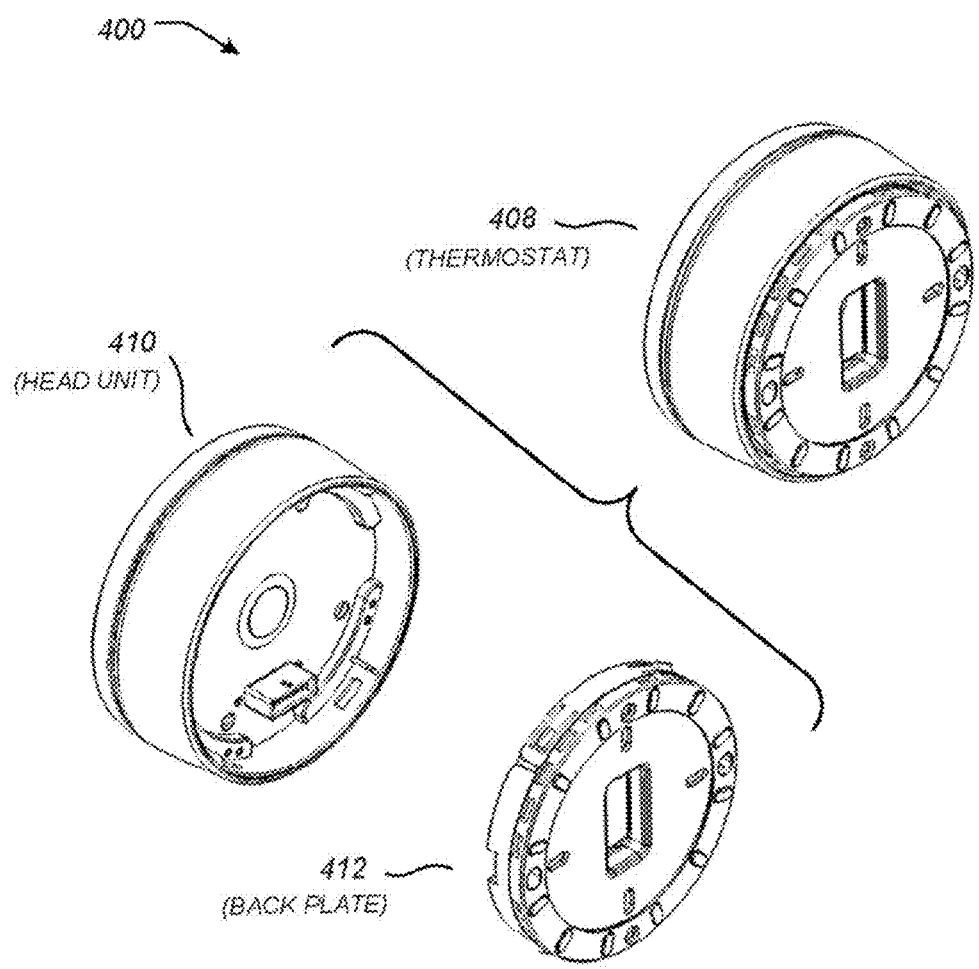
FIG. 4 illustrates an exploded perspective view of a thermostat having a head unit and the backplate, according to one embodiment.

In some embodiments, the thermostat can be physically and/or functionally divided into at least two different units. Throughout this disclosure, these two units can be referred to as a head unit and a backplate. FIG. 4 illustrates an exploded perspective view 400 of a thermostat 408 having a head unit 410 and a backplate 412, according to one embodiment. Physically, this arrangement may be advantageous during an installation process. In this embodiment, the backplate 412 can first be attached to a wall, and the HVAC wires can be attached to a plurality of HVAC connectors on the backplate 412. Next, the head unit 410 can be connected to the backplate 412 in order to complete the installation of the thermostat 408.

Figure 5A:
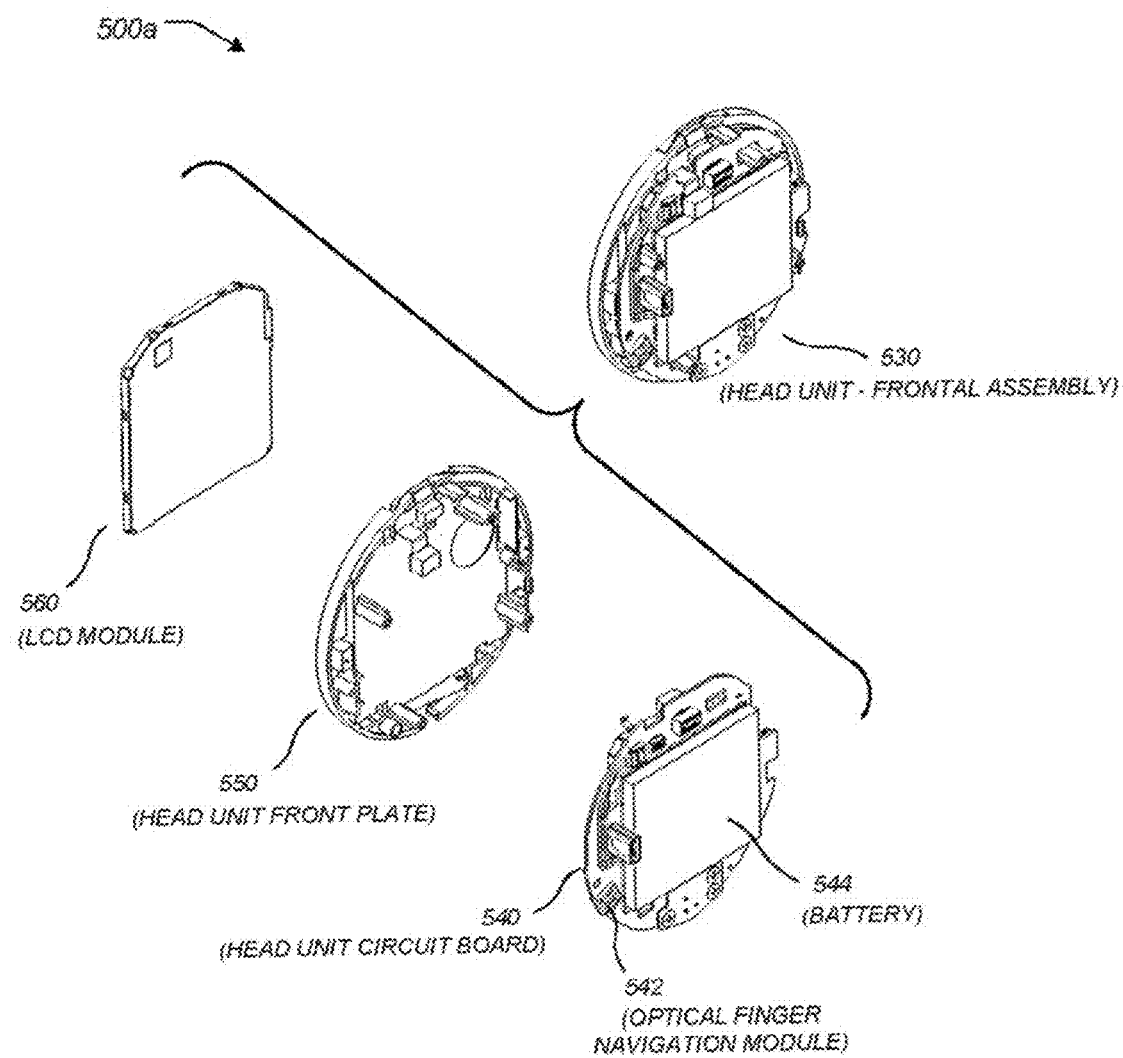
FIG. 5A illustrates an exploded perspective view of a head unit with respect to its primary components, according to one embodiment.

FIG. 5A illustrates an exploded perspective view 500a of a head unit 530 with respect to its primary components, according to one embodiment. Here, the head unit 530 may include an electronic display 560. According to this embodiment, the electronic display 560 may comprise an LCD module. Furthermore, the head unit 530 may include a mounting assembly 550 used to secure the primary components in a completely assembled head unit 530. The head unit 530 may further include a circuit board 540 that can be used to integrate various electronic components described further below. In this particular embodiment, the circuit board 540 of the head unit 530 can include a manipulation sensor 542 to detect user manipulations of the thermostat. In embodiments using a rotatable ring, the manipulation sensor 542 may comprise an optical finger navigation module as illustrated in FIG. 5A. A rechargeable battery 544 may also be included in the assembly of the head unit 530. In one preferred embodiment, rechargeable battery 544 can be a Lithium-Ion battery, which may have a nominal voltage of 3.7 volts and a nominal capacity of 560 mAh.

Figure 5B:
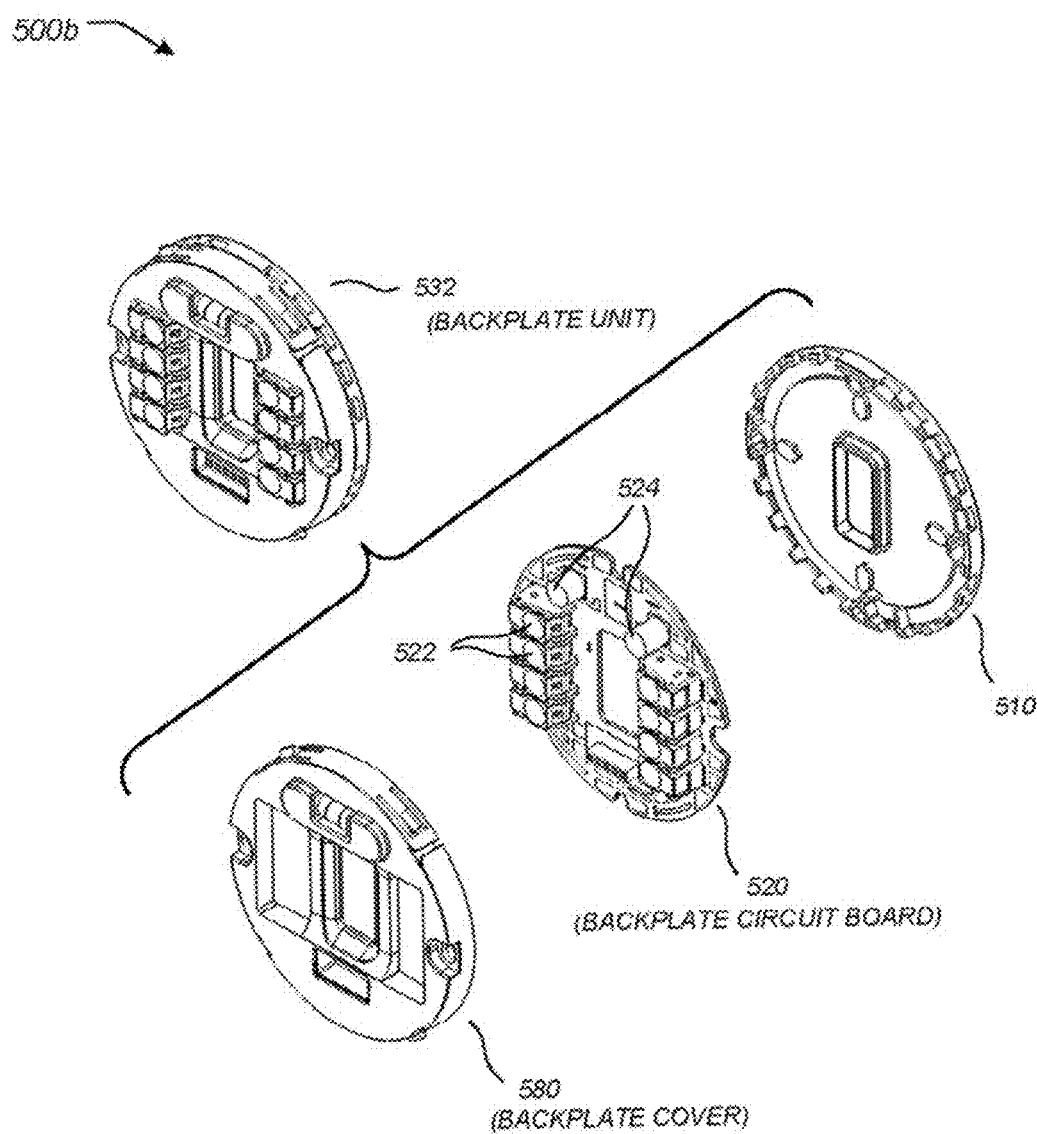
FIG. 5B illustrates an exploded perspective view of a backplate with respect to its primary components, according to one embodiment.

FIG. 5B illustrates an exploded perspective view 500b of a backplate 532 with respect to its primary components, according to one embodiment. The backplate 532 may include a frame 510 that can be used to mount, protect, or house a backplate circuit board 520. The backplate circuit board 520 may be used to mount electronic components, including one or more processing functions, and/or one or more HVAC wire connectors 522. The one or more HVAC wire connectors 522 may include integrated wire insertion sensing circuitry configured to determine whether or not a wire is mechanically and/or electrically connected to each of the one or more HVAC wire connectors 522. In this particular embodiment, two relatively large capacitors 524 are a part of power stealing circuitry that can be mounted to the backplate circuit board 520. The power stealing circuitry is discussed further herein below.

Figure 6A:
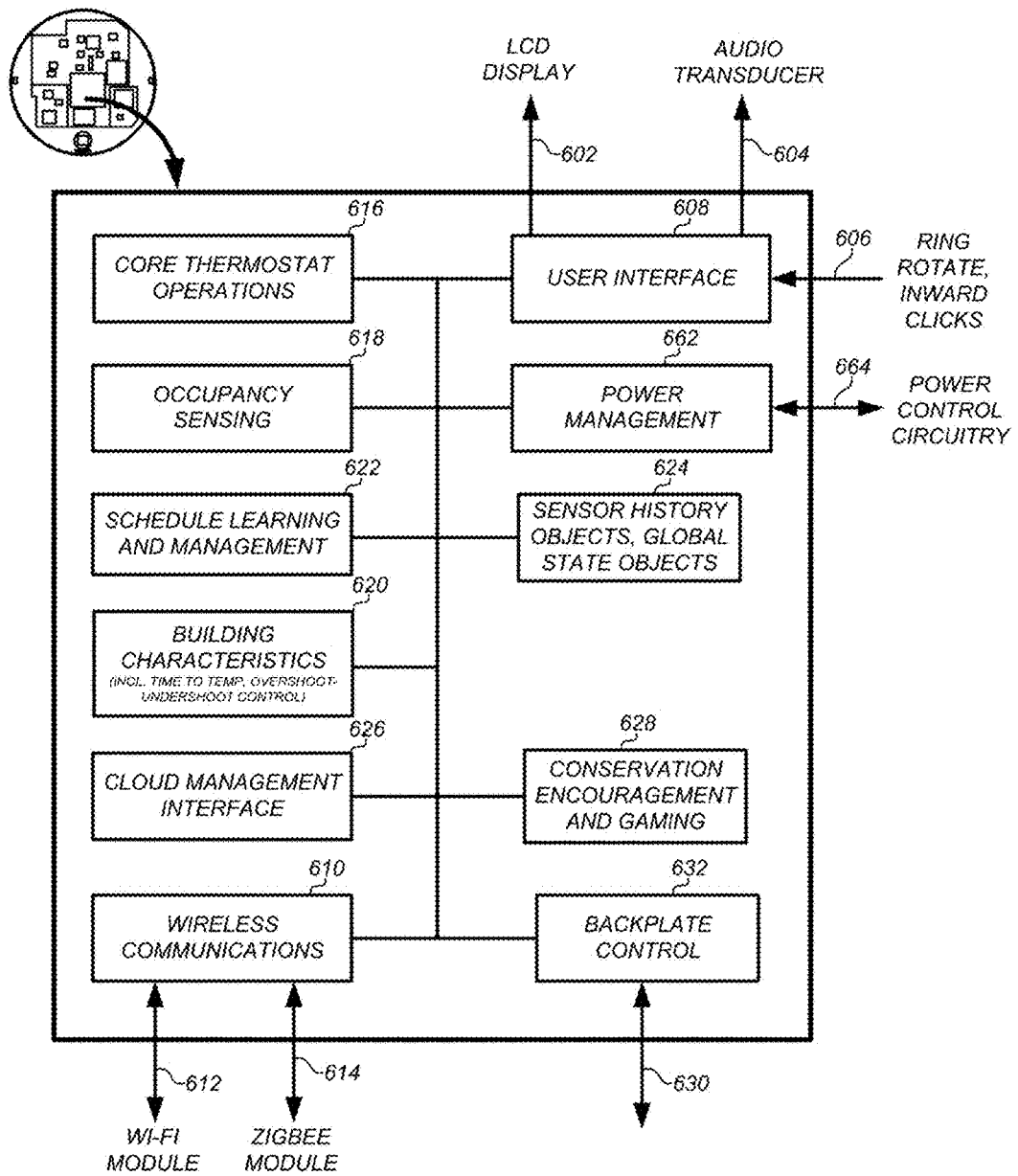
FIG. 6A illustrates a simplified functional block diagram for a head unit, according to one embodiment.

In addition to physical divisions within the thermostat that simplify installation process, the thermostat may also be divided functionally between the head unit and the backplate. FIG. 6A illustrates a simplified functional block diagram 600a for a head unit, according to one embodiment. The functions embodied by block diagram 600a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 602, an audio system 604, and a manipulation sensor 606 as a part of a user interface 608. The head unit processing function may also facilitate wireless communications 610 by interfacing with various wireless modules, such as a Wi-Fi module 612 and/or a ZigBee module 614. Furthermore, the head unit processing function may be configured to control the core thermostat operations 616, such as operating the HVAC system. The head unit processing function may further be configured to determine or sense occupancy 618 of a physical location, and to determine building characteristics 620 that can be used to determine time-to-temperature characteristics. Using the occupancy sensing 618, the processing function on the head unit may also be configured to learn and manage operational schedules 622, such as diurnal heat and cooling schedules. A power management module 662 may be used to interface with a corresponding power management module on the back plate, the rechargeable battery, and a power control circuit 664 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 624. The one or more memories may be integrated with the processing function, such as a flash memory or RAM memory available on many commercial microprocessors. The head unit processing function may also be configured to interface with a cloud management system 626, and may also operate to conserve energy wherever appropriate 628. An interface 632 to a backplate processing function 630 may also be included, and may be implemented using a hardware connector.

Figure 6B:
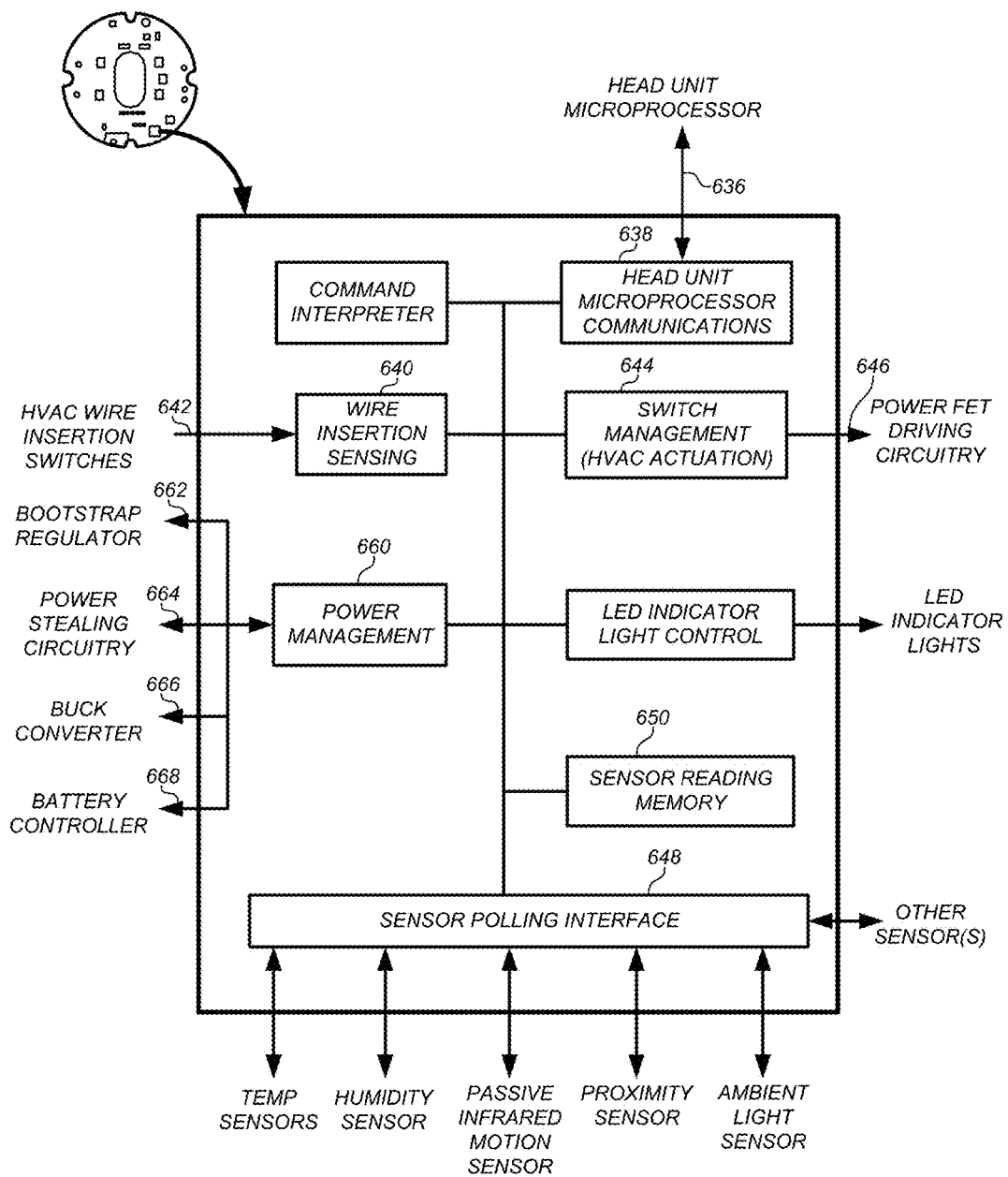
FIG. 6B illustrates a simplified functional block diagram for a backplate, according to one embodiment.

FIG. 6B illustrates a simplified functional block diagram for a backplate, according to one embodiment. Using an interface 636 that is matched to the interface 632 shown in FIG. 6A, the backplate processing function can communicate with the head unit processing function 638. The backplate processing function can include wire insertion sensing 640 that is coupled to external circuitry 642 configured to provide signals based on different wire connection states. The backplate processing function may be configured to manage the HVAC switch actuation 644 by driving power FET circuitry 646 to control the HVAC system.

The backplate processing function may also include a sensor polling interface 648 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 648 may be communicatively coupled to a sensor reading memory 650. The sensor reading memory 650 can store sensor readings and may be located internally or externally to a microcontroller or microprocessor.

Finally, the backplate processing function can include a power management unit 660 that is used to control various digital and/or analog components integrated with the backplate and used to manage the power system of the thermostat. Although one having skill in the art will recognize many different implementations of a power management system, the power management system of this particular embodiment can include a bootstrap regulator 662, a power stealing circuit 664, a buck converter 666, and/or a battery controller 668.

Figure 7:
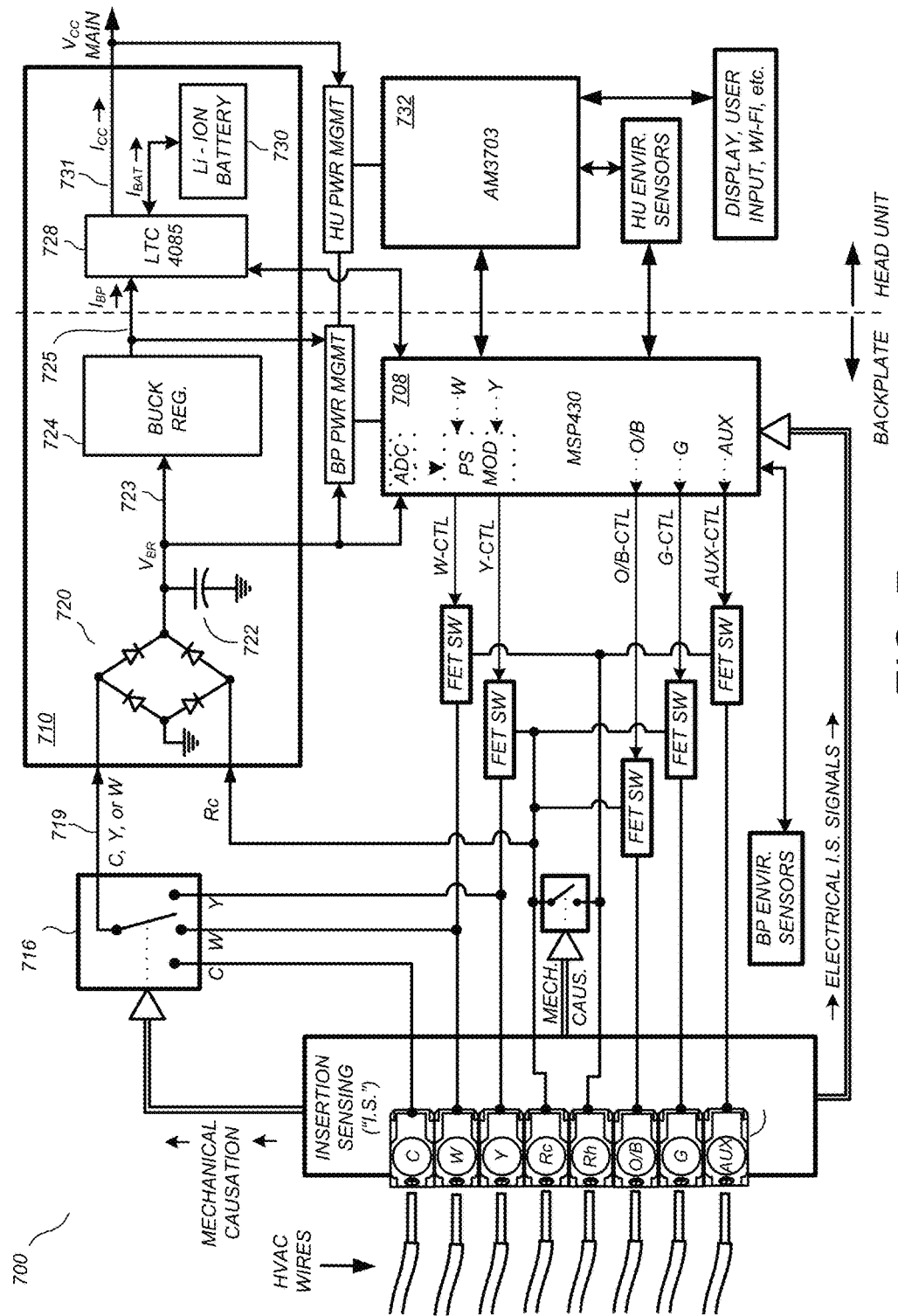
FIG. 7 illustrates a simplified circuit diagram of a system for managing the power consumed by a thermostat, according to one embodiment.

FIG. 7 illustrates a simplified circuit diagram 700 of a system for managing the power consumed by a thermostat, according to one embodiment. The powering circuitry 710 comprises a full-wave bridge rectifier 720, a storage and waveform-smoothing bridge output capacitor 722 (which can be, for example, on the order of 30 microfarads), a buck regulator circuit 724, a power-and-battery (PAB) regulation circuit 728, and a rechargeable lithium-ion battery 730. In conjunction with other control circuitry including backplate power management circuitry 727, head unit power management circuitry 729, and the microcontroller 708, the powering circuitry 710 can be configured and adapted to have the characteristics and functionality described herein below. Description of further details of the powering circuitry 710 and associated components can be found elsewhere in the instant disclosure and/or in U.S. Ser. No. 13/467,025, supra.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. The powering circuitry 710 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 710 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 710 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 730. In other words, when the thermostat is engaged in operations, such as when the electronic display is in an active display mode, power may be supplied by both power stealing and the rechargeable battery 730. In order to preserve the power stored in the rechargeable battery 730, and to give the rechargeable battery 730 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 730. In this embodiment, the backplate processing function 708 (MSP430) can be configured to monitor the environmental sensors in a low-power mode, and then wake the head unit processing function 732 (AM3703) when needed to control the HVAC system, such as to recalculate an optimal control strategy as described herein. Similarly, the backplate processing function 708 can be used to monitor sensors used to detect ambient temperature conditions, and wake the head unit processing system 732 and/or the electronic display when it is determined that a maintenance band threshold has been crossed and/or an anticipated wakeup time or event has occurred.

Stated differently, in accordance with the teachings of the commonly assigned U.S. Ser. No. 13/467,025, supra, and others of the commonly assigned incorporated applications, the thermostat described herein represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described predictive control algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. By way of example, the head unit microprocessor can draw on the order of 250 mW when awake and processing, the LCD module (e.g., 560) can draw on the order of 250 mW when active. Moreover, the Wi-Fi module (e.g., 612) can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat resolves such issues at least by virtue of the use of the rechargeable battery (e.g., 544 (or equivalently capable onboard power storage medium)) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat is provided with both (i) a relatively powerful and relatively power-intensive first processor (such as a Texas Instruments AM3703 microprocessor) that is capable of quickly performing more complex functions such as driving a visually pleasing user interface display, computing a parameterized prediction model, applying the parameterized prediction model to a set of selected control strategies, minimizing a cost function to determine an optimal control strategy, and performing various other mathematical learning computations, and (ii) a relatively less powerful and less power-intensive second processor (such as a Texas Instruments MSP430 microcontroller) for performing less intensive tasks, including driving and controlling the occupancy sensors, driving and controlling temperature sensors, and the like. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, such as sensing a condition that necessitates recalculating a predictive control strategy, which can be termed "wake-on" facilities. These wake-on facilities can be turned on and turned off as part of different functional and/or power-saving goals to be achieved. For example, an ambient temperature sensor can be provided by which the second processor, when detecting an ambient temperature or other condition that necessitates recalculating a predictive control strategy will "wake up" the first processor so that it can perform one or more operations of the predictive control algorithm described herein or instruct the HVAC system to cycle between an on and off state.

It will be understood by one having skill in the art that the various thermostat embodiments depicted and described in relation to FIGS. 3-7 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Figure 8A:
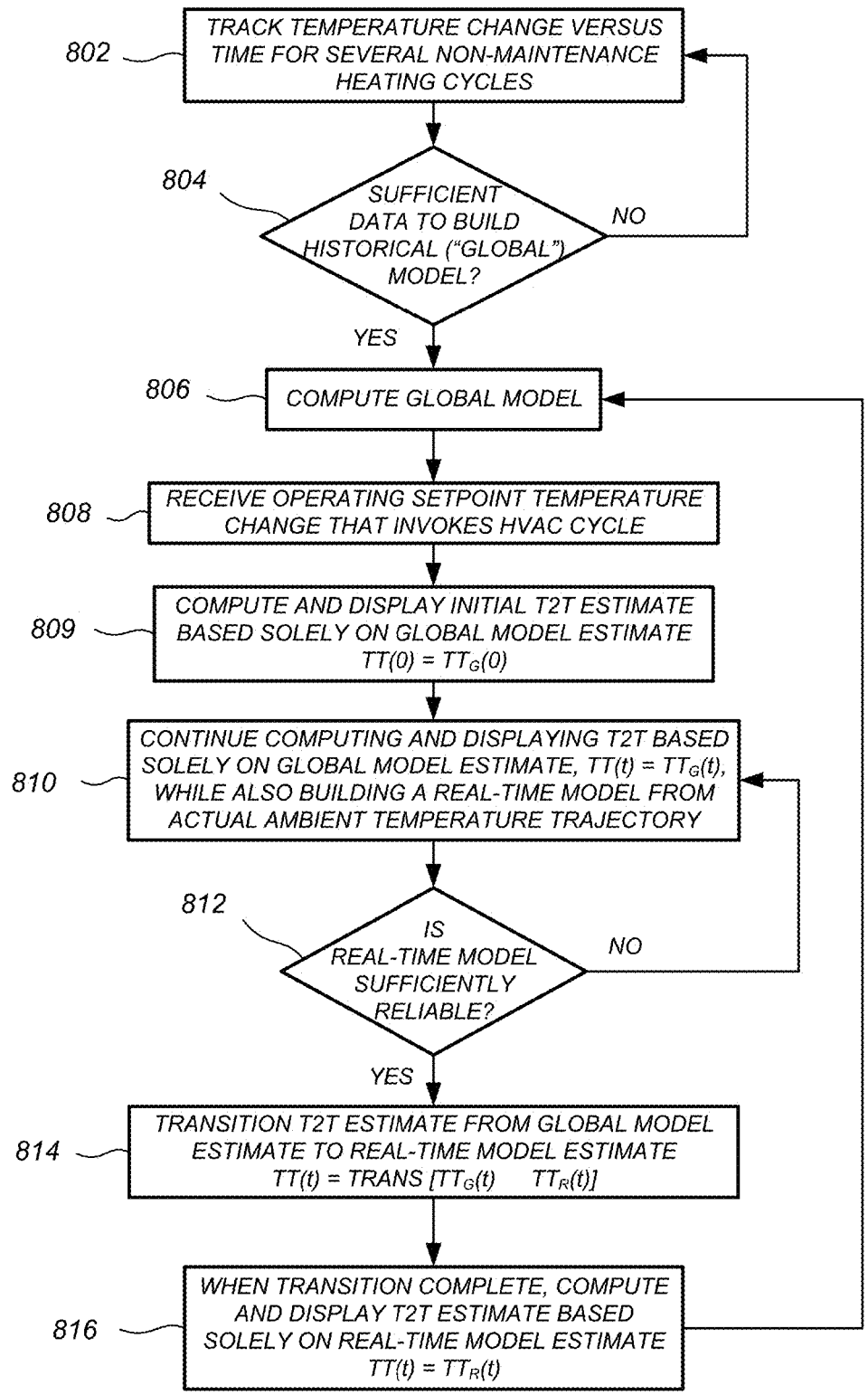
FIG. 8A illustrates a method for a time to temperature computation, according to one embodiment.

FIG. 8A illustrates steps for a time to temperature computation according to an embodiment. As used herein, time to temperature ("T2T") refers to an estimate of the time remaining from the current point in time until the target temperature will be reached. As described herein, the T2T information computed by the thermostat is specific to the heated or cooled enclosure, or in other words, the determined T2T is tailored to the enclosure. In view of the variety of factors that can affect the course of a temperature trajectory over a particular real-world HVAC cycle, the methods described herein have been found to yield reasonably good estimations. Moreover, in the face of the many real-world variations that can occur, some predictable and others not so predictable, the currently described methods for selective display of the T2T information (for example, displaying "under 10 minutes" when the T2T time is getting small and not displaying the T2T information if it is "behaving" in an unexpected or unreliable manner) have been found to provide pleasing overall user experiences with the T2T facility that increase the overall appeal and attractiveness of the thermostat such that the user will be drawn to engage further with its energy-saving features and energy-conscious ecosystem. Notably, while the described examples are provided in the particular context of heating, the skilled artisan would readily be able to apply counterpart methods for the cooling context, which are thus within the scope of the present teachings.

According to one preferred embodiment, the thermostat's T2T algorithm is first implicated by virtue of a learning phase (step 802) that occurs soon after first installation or factory reset, whereby the thermostat begins to build and maintain its own database of T2T-related information, which is customized for that particular enclosure and that particular HVAC system, during the normal course of operation in a first predetermined number of "meaningful" or "non-maintenance" heating cycles. By "non-maintenance" heating cycle, it is meant that there has been an actual setpoint temperature change upon which the heating cycle was instantiated. This can be contrasted with a "maintenance" heating cycle, in which the setpoint temperature has remained the same but the HVAC system was activated due to a drop in temperature and operated until that temperature was again reached (maintained). In one example, the predetermined number of "learning" heating cycles is 10, although this can be varied substantially without departing from the scope of the present teachings. For each such learning cycle, the thermostat automatically (without requiring any affirmative instruction or teaching from the user) tracks the temperature change $\Delta H(t)$ versus time "t", where t=0 represents the beginning of the heating cycle.

After a suitable number of learning cycles (step 804), there is built up a sufficient amount of data to automatically generate a historical model "G" of the enclosure, which can alternatively be termed a "global" model, that can be used to provide an initial estimate at the outset of subsequent T2T calculations. The global model can subsequently be continuously improved using more data points as time goes forward, since each heating cycle represents yet another "experiment" for that enclosure to improve the "global model estimate," which can also be termed a "historical model estimate." For one preferred embodiment, the time span of the global model can be limited to only a recent period, such as the most recent 30 to 60 days, so that it will be more likely to reflect the effects of the current season of the year.

Figure 8B:
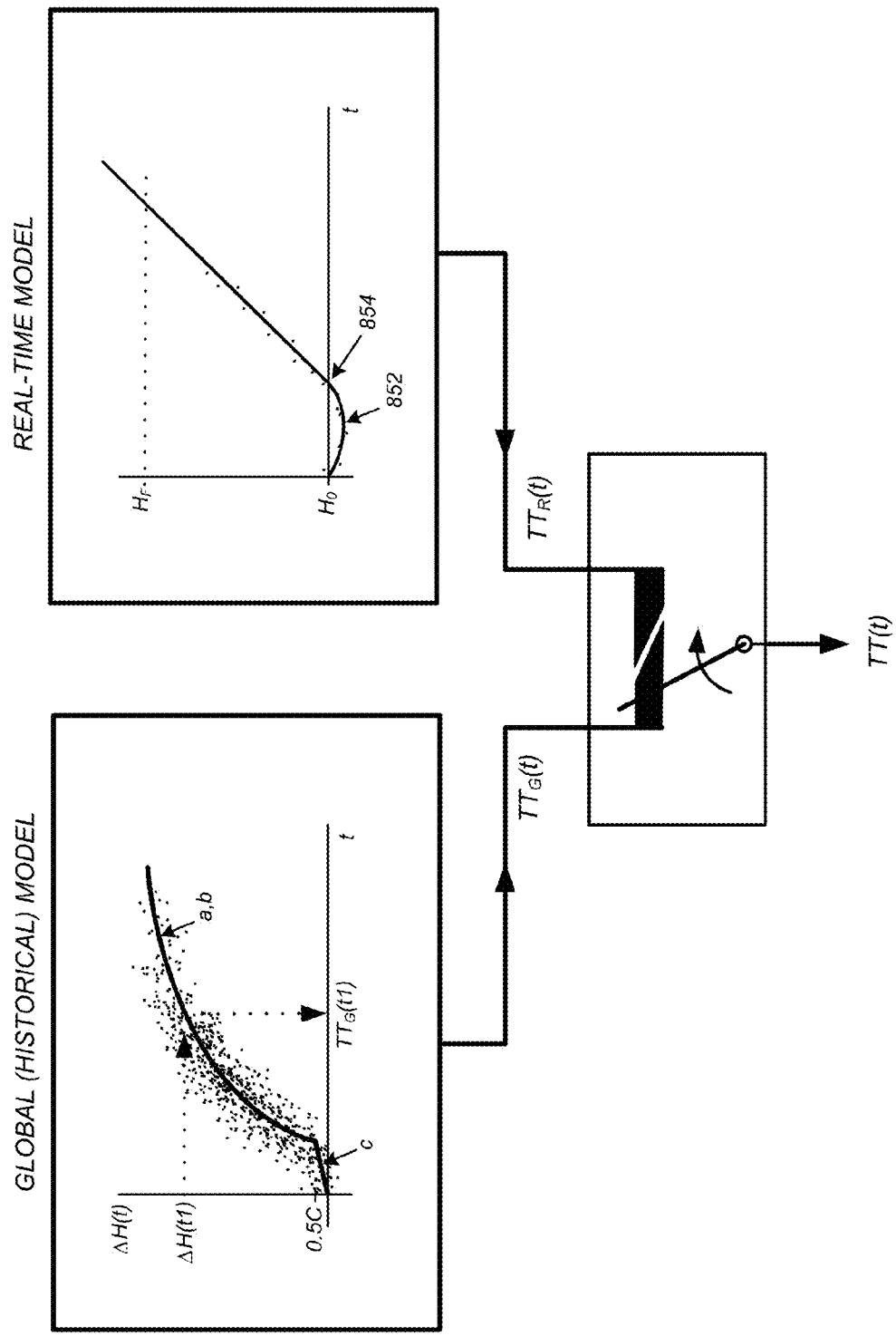
FIG. 8B illustrates a conceptual diagram of the method of FIG. 8A, according to one embodiment.

FIG. 8B illustrates a conceptual diagram of the method of FIG. 8A, including a plot of the global model G. One mathematical function that has been found to be convenient to compute, along with being reasonably suitable, characterizes the global model as a single-parameter straight line (with linear parameter "c") between $\Delta H=0$ and $\Delta H=0.5$ degrees C., and then a two-parameter curve beyond that point (with linear and quadratic parameters "a" and "b", respectively).

Referring now again to FIG. 8A, at step 808 the T2T algorithm is put into use when the current operating setpoint temperature is changed from an initial value $H_0$ to a desired final value $H_F$. This setpoint change can be invoked by a user by using either the walk-up dial or a remote network access facility, or alternatively can be when there is a scheduled setpoint change encountered that changes the current operating setpoint temperature. At step 812, an initial estimate T2T(0) is computed using only the global model G, by mapping the value $H_F-H_0=\Delta H(0)$ into T2T(0) using the global model G as shown in FIG. 8B. This initial estimate, which can be called a global-model initial estimate, can be shown immediately on the thermostat display, even in real time as the user turns the dial for the case of a manual walk-up setpoint change.

At step 810, in what will usually last over the next several minutes of the heating cycle, a global-model estimate continues to be used to provide the current time to temperature estimate TT(t), by virtue of mapping the current measured room temperature H(t) into TT(t) using the global model G. The global model T2T estimate is denoted herein by $TT_G(t)$. The actual room temperature values H(t) can be provided at regular periodic intervals, such as every 30 seconds, by the thermostat sensing circuitry. According to a preferred embodiment, during this time period in which the global estimate is being used for display purposes, a real-time model R is being built up by virtue of tracking the current value of $\Delta H(t)=H(t)-H_0$ versus time. It has been found by the present inventors that the real-time model R, which can alternatively be called a "local" model, does not become useful for purposes of T2T estimation until such time as a reasonably straight line (statistically speaking) can be established, and that this straight line can often not be established until there has been a certain predetermined empirically-established rise, such as 0.2 degrees C., at a point 854 following a lowest point 852 in trajectory of H(t). One empirically-established guideline that has been found useful is to wait until 10 temperature samples spaced 30 seconds apart subsequent to the 0.2 degree C. post-nadir rise point 854 until a reasonably appropriate estimate can be computed using the real-time model. According to one preferred embodiment, the real-time model R can be used to establish a "real-time model estimate" by using a straight-line projection onto the target temperature line, as shown in FIG. 8B. The real-time model T2T estimate is denoted herein by $TT_R(t)$. For one embodiment, only the latest 10 temperature samples (or other suitable number of recent samples) are used to project the straight line that computes the real-time estimate $TT_R(t)$. In other embodiments, all of the data points subsequent to the point 854 can be used to compute the $TT_R(t)$.

If at step 812 it is determined that the real-time model estimate $TT_R(t)$ is not sufficiently reliable (e.g., using the above-described criterion of 10 points spaced 30 seconds apart following the point 854), then step 810 repeats until such time as $TT_R(t)$ is sufficiently reliable, whereupon step 814 is carried out. At step 814 there is instantiated a transition between the global-model estimate $TT_G(t)$ real-time model estimate $TT_R(t)$, such that there is not a "jump" in the actual value of TT(t), which can be disconcerting to a user who is viewing the display, the transition being summarized as $TT(t)=TRANS[TT_G(t) \rightarrow TT_R(t)]$. The transition can be achieved in a variety of ways without departing from the scope of the present teachings, but in one preferred embodiment is performed as a straight-line transition from one curve to the other, where the transition occurs at a rate of not more than 10 seconds per second. Once the transition is complete, the real-time estimate alone can be used (step 816) until the end of the cycle.

As indicated in FIG. 8A, subsequent to the end of the cycle at step 816, there can be carried out a recomputation of the global model at step 806 so that the most recent historical data can be leveraged prior to instantiation of the next heating cycle. Alternatively, the global model can be recomputed once every several cycles, once per day, or on some other periodic basis.

Preferably, there are plural safeguards incorporated along with the steps 814-816 such that "sanity" is retained in the displayed T2T estimate. If the safeguards indicate a state of unreliability or other "sanity" problem for the real-time model estimate, then the T2T display is simply turned off, and instead of a time reading, there will simply by the word HEATING (or the like) that is displayed. By way of example, if the statistical deviation of the data samples from a straight line subsequent to point 854 is greater than a certain threshold, the T2T display is turned off. Likewise, if the real-time model estimate of T2T starts growing for an extended period of time, or indicates an unreasonably large number, the T2T display is turned off.

Exemplary Predictive Control Systems

Figure 9:
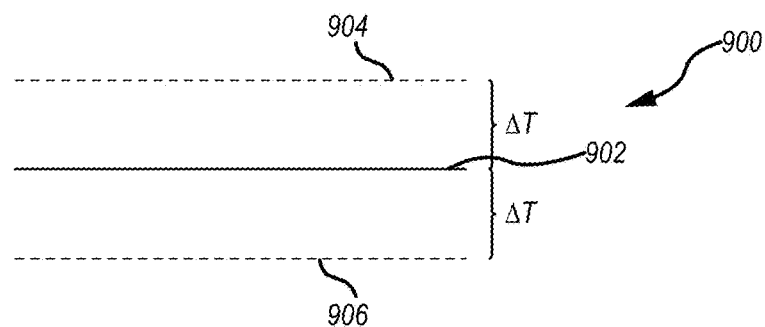
FIG. 9 illustrates a maintenance band that may be used in HVAC controls, according to one embodiment.

As shown in FIG. 9, conventional thermostats typically control a home's temperature by defining a temperature or maintenance band 900 around a desired or set temperature 902 (referred to herein as a setpoint temperature). The maintenance band 900 typically is defined by an offset value ΔT that defines an upper maintenance band threshold temperature 904 and a lower maintenance band threshold temperature 906. A common offset value ΔT for such maintenance bands 900 is ±0.7 degrees from the set temperature. For example, is the setpoint temperature is 72° Fahrenheit, the upper maintenance band threshold 904 will be approximately 72.7° Fahrenheit (e.g., 72+0.7) and the lower maintenance band threshold 906 will be approximately 71.3° Fahrenheit (e.g., 72−0.7).

Common thermostat controls that use such maintenance bands are known as bang-bang controls. While the term ON-OFF control is also sometimes used to describe such controls, the term bang-bang is used herein as being more descriptive than the relatively generic term ON-OFF. For a heating operation, these controls will cycle an HVAC system on when an ambient temperature drops below the lower maintenance band threshold 906 and cycle an HVAC system off when the ambient temperature rises above the upper maintenance band threshold 904. The reverse is true for cooling operations, namely, the HVAC system is cycled on when the ambient temperature rises above the upper maintenance band threshold 904 and the HVAC system is cycled off when the ambient temperature drops below the lower maintenance band threshold 906. For example, using bang-bang controls for a heating operation and the above described 72° Fahrenheit setpoint, the thermostat will cycle the HVAC system's heater on when the ambient temperature drops below 71.3 degrees and cycle the heater off when the temperature rises above 72.7 degrees.

Bang-bang controls are very reactive in nature since they cycle HVAC systems on and off only when the ambient temperature band crosses a defined threshold (i.e., the upper and lower maintenance bands). Further, these controls do not account for thermal mass and thermal inertia in an enclosure, which as described herein may lead to significant overshooting and/or undershooting. As used herein, the term "thermal inertia" refers to a speed with which a material or body's temperature will equalize with a surrounding temperature. Thermal inertia is a bulk material property that is related to a material's thermal conductivity and volumetric heat capacity and is often dependent upon its absorptivity, specific heat, thermal conductivity, dimensions, and the like.

As used herein, the term "system inertia," while being related to thermal inertia, refers in a more general sense to the speed at which the ambient temperature of a home (or other enclosure) will actually respond to the activation of a heating or cooling cycle for the home (or other enclosure). System inertia can take into account the nature of the heating or cooling equipment itself and the manner in which heat is transferred into the home. Thus, by way of example, a particular home having a radiant heating system may exhibit a relatively large system inertia (heats up slowly) if the radiant heating system is low-powered or weak, whereas that same home may exhibit a much smaller system inertia (heats up quickly) if that radiant heating system were replaced by a much more powerful one. When viewing the home and its HVAC system as a control system in which the input is the on/off state of the HVAC system and the output is the ambient temperature that the occupant feels, the system inertia can be seen as a static or quasi-static element of the model for that control system.

An example of the effects of relatively high system inertia is evident in many radiant heating systems for homes where the floor of the home is often heated and the surrounding air is heated via radiation and convection from the heated floor, with radiation typically being the dominant mode of heat transfer. The heating of the ambient air can often take place rather slowly, due to both the fact that it often takes substantial time for the floor itself to heat up as well as the fact that the radiant heat transfer modality from the floor into the air also takes time. The continued heat radiation causes the home's temperature to continue to rise or "overshoot" the setpoint temperature, sometimes well above the setpoint temperature, which can cause discomfort to occupants. A similar effect is evident when heating is again performed as the floor must be heated before heating the surrounding air. The thermal inertia of the floor or home causes the floor's temperature to temporarily drop while the floor is being heated or "undershoot" the setpoint temperature, which can likewise cause discomfort.

Embodiments of the invention include predictive controls or model predictive controls for heating and/or cooling a home. These controls are different than conventional bang-bang controls where a heating or cooling operation is performed only when a temperature rises or falls outside defined a maintenance band window. Using predictive controls, a heating or cooling operation may be discontinued or engaged even when the ambient temperature is within the temperature band window (i.e., the ambient temperature has not crossed a maintenance band threshold) or even when an ambient temperature has not entered a maintenance band window.

The methods and systems described herein are generally directed toward HVAC systems characterized by a relatively high system inertia, such as many radiant heating systems, although the methods and systems may likewise be used for other types of systems that may exhibit behaviors or symptoms, either on a temporary, seasonal, or permanent basis, of having a high system inertia. Likewise, although the methods and systems described herein are directed mainly toward radiant heating systems, the methods and systems described herein may be apply equally to radiant cooling systems or other types of heating or cooling systems. Thus, while the terms "radiant heat", "radiant system", and the like are used in the description below for purposes of clarity of description, it is to be appreciated that the scope of the present teachings is not so limited.

According to some embodiments, provided is a smart radiant heating control mode for the home HVAC system that is carried out by an intelligent, multi-sensing thermostat. When it has been established due to automated sensing and/or affirmative user input (see FIG. 22, infra, and associated automated "system match" discussion) that smart radiant heat control is to be invoked, the thermostatic control of the heating modality proceeds according to a predictive control algorithm that is judiciously invoked according to an availability of parameters for a predetermined home heating system model in which sufficient confidence has been established. For one embodiment, the parameters for the system model is based solely on data collected from historical heating cycles in which the radiant heating system was used. For other embodiments, other factors such as time of day, outside temperatures, wind conditions, solar heating angles, orientation of the home and windows relative to the sun, and/or any of a variety of other relevant information can be used in determining the parameters. For purposes of ensuring a smooth, consistent, pleasant occupant experience, the predictive control algorithm is only invoked when sufficient confidence has been established in the home heating system model, or when sufficient confidence has been regained after having been lost due to recent anomalous or partially anomalous measured events. By an anomalous or partially anomalous event, it is meant that something occurred with the data used to compute the heating system model that caused a model confidence metric to deteriorate, such as a door or window is left open for an extended time period during winter, data loss events, power failures, extraordinary weather conditions, and the like.

When not operating in the predictive control mode, the smart radiant control algorithm operates according to a modified version of a bang-bang control mode that is designed to be substantially more aggressive toward reduction of overshoot. More particularly, the aggressive overshoot reduction method comprises bang-bang control of the ambient temperature to within a particular maintenance band, termed herein an "aggressive overshoot reduction maintenance band", of the current setpoint temperature in which both the upper maintenance band temperature and the lower maintenance band temperature lie below the current setpoint temperature. Thus, while conventional thermostatic bang-bang temperature control for a setpoint temperature of "T" may maintain a symmetric temperature band of $(T-\Delta T)$ to $(T+\Delta T)$ around the setpoint temperature T, and while moderate overshoot-reducing bang-bang temperature control may maintain an asymmetric temperature band of $(T-\Delta T1)$ to $(T+\Delta T2)$, where $\Delta T1 > \Delta T2 > 0$, the currently described aggressive overshoot reduction method comprises bang-bang control to within an asymmetrically offset maintenance band of $(T-\Delta T3)$ to $(T-\Delta T4)$, where $\Delta T3 > \Delta T4 > 0$. By way of example only and not by way of limitation, for a typical setpoint temperature of 72 degrees F., the values for $\Delta T3$ and $\Delta T4$ may be 1.0 degree F. and 0.5 degree F., respectively.

The use of aggressive overshoot-reducing bang-bang control as a "fallback" in the event that sufficient confidence has not been established (or has been lost) in the system model for predictive control has been found to provide a more beneficial user experience than the use of traditional bang-bang control. Nevertheless, the scope of the preferred embodiments is not so limited, and in other embodiments the "fallback" can be the use of a symmetric or moderately asymmetric bang-bang control maintenance band around the setpoint temperature.

For one preferred embodiment, it has been found particularly effective to incorporate a sort of "hysteresis" around the invocation of predictive control versus a non-predictive or "fallback" control method. By way of example, if operating in a non-predictive mode, it is required that at least two consecutive days of model parameter confidence be established before invoking the predictive control mode. Likewise, if operating in a predictive control mode, it is required that at least two consecutive days of model parameter non-confidence be established before invoking the non-predictive control mode. Advantageously, this sort of "hysteresis" around the selective invocation of predictive control mode further enhances the continuity of experience that is felt by the home occupants.

Operation of the smart radiant heat algorithm while in predictive control mode according to some embodiments is now described. To implement the predictive controls, a system may be configured to perform a "predictive control algorithm". For example, the thermostat's processing system may access memory having the predictive control algorithm stored thereon and may perform one or more of the processes, computations, and the like described hereinbelow. In one embodiment, some or all of the processes, computations, and the like, are performed by the relatively high-power consuming processor of the head unit with the processor is in the active or awake operational mode. In another embodiment, some or all of the processes, computations, and the like, are performed by the relatively low-power consuming backplate processor. In other embodiments, one or more of the processes, computations, and the like, are shared between the head unit processor and the backplate processor and/or information is shared therebetween. For convenience in describing the various embodiments, the description will be directed mainly toward the predictive control algorithm.

In some embodiments, the predictive control algorithm may determine if the predictive control features are appropriate for the home's thermostat system. For example, the predictive control algorithm may determine if undershooting or overshooting is occurring and/or by what amount. In some radiant heating situations, the ambient temperature may quickly begin to rise when a heating cycle begins and may quickly drop when the heat cycling is terminated. If undershooting and/or overshooting is not a considerable problem, the predictive control algorithm may determine that the predictive control features described herein are not needed. In such embodiments, the predictive control algorithm may determine if predictive controls are even necessary and adjust an "on/off" setting of the thermostat accordingly.

It is to be appreciated that, while a system model that includes a "Lag" parameter is set forth below to represent one particular way that a radiant heating system might be characterized to a reliable degree upon collection of historical radiant heating performance data by the intelligent thermostat, any of a variety of different modeling methods having any of a variety of different degrees of complexity and types of modeling parameters can be used without departing from the scope of the present teachings. For example, while the "Lag" parameter described hereinbelow represents a sort of "hybrid" between (i) a static or quasi-static parameter representative of the system inertia of the home and its HVAC system, and (ii) a dynamic, time-dependent, and/or condition-dependent parameter that could depend on various factors such as time of day, season, outside temperature, solar radiation implications, and so forth, it is certainly within the scope of the present teachings to model the home heating system using more or different parameters such that (a) static or quasi-static properties of the enclosure/HVAC system are captured and maintained, and (b) multiple dynamic parameters representative of more dynamic, time-dependent, and/or condition-dependent parameter are separately captured, maintained, and used for the appropriate combination of times and conditions.

To determine if the predictive controls are needed, the predictive control algorithm may calculate or measure an enclosure or system's inertia. Measuring a system's inertia refer generally to capturing one, two, or more characteristic constants, that represent dynamics of the house. These constants could be identified using system identification techniques, such as the ones described herein. In one embodiment, the predictive control algorithm may calculate or measure an enclosure's "Lag". The term Lag refers to the time required to raise the temperature of the enclosure by a defined amount (e.g., 0.5° Fahrenheit, 3° Fahrenheit, 5° Fahrenheit, and the like) after applying heat and is a simple representation that at least partially takes into account the enclosure's thermal inertia, although there are also some dynamic/condition-dependent components to it as well. In some embodiments, Lag measurements may not be calculated unless the HVAC system has been off for a defined period, such as 60 seconds, to ensure that no residual heat remains in the enclosure from previous heating cycles. Similarly, the HVAC system may be required to stay on for a predefined time before a Lag measurement is recorded, such as until the enclosure's ambient temperature rises by the defined amount (e.g., 5° Fahrenheit). If the HVAC system cycles off before the enclosure's ambient temperature rises by this amount, the Lag measurement may be discarded.

Several Lag measurements may also be recorded at defined periods throughout the day to allow the predictive control algorithm to account for temperature rises or drops that may be due to environmental factors such as exposure to sun, rain, overcast conditions, and the like. According to one embodiment, a day may be divided into equal time periods (e.g., 6 hour increments) that represent a pre-dawn period (e.g., 12 a.m. to 6 a.m.), a morning period (e.g., 6 a.m. to 12 p.m.), an afternoon period (e.g., 12 p.m. to 6 p.m.) and an evening period (e.g., 6 p.m. to 12 a.m.). Lag measurement may be recorded during each of these time periods, and in some embodiments, an average Lag value may be calculated from the various time period Lag measurements. The average Lag value may be used in implementing the predictive control methods described herein. According to another embodiment, an average Lag value may be determined for each of the time periods. The time period specific Lag value may subsequently be used in implementing the described predictive control methods in order to obtain a more precise approximation of the radiant heating effects.

For example, an evening period Lag value may be significantly larger than a morning period Lag value. In some embodiments, the Lag measurements may be taken even if the predictive control feature is disabled. Accordingly, the average Lag values may be available for use upon the user enabling the predictive control feature. In other embodiments, such as when the thermostat is newly installed, the system may be required to run for a defined time period (e.g., 1 week) before the predictive control feature is available in order to allow Lag values to be measured and recorded and an average value to be calculated.

The average Lag value may be modified, adjusted, and/or updated at defined time periods as the system adjusts to the specific heating properties of the enclosure. For example, the system can continually measure and record Lag values and modify or adjust an average Lag value to more approximately model the enclosure. This process may be done monthly, weekly, nightly, and the like. More recently measured Lag values may be weighted so that they influence the average Lag value more. In this manner, the Lag value may approximately match current conditions for the enclosure.

Figure 10:
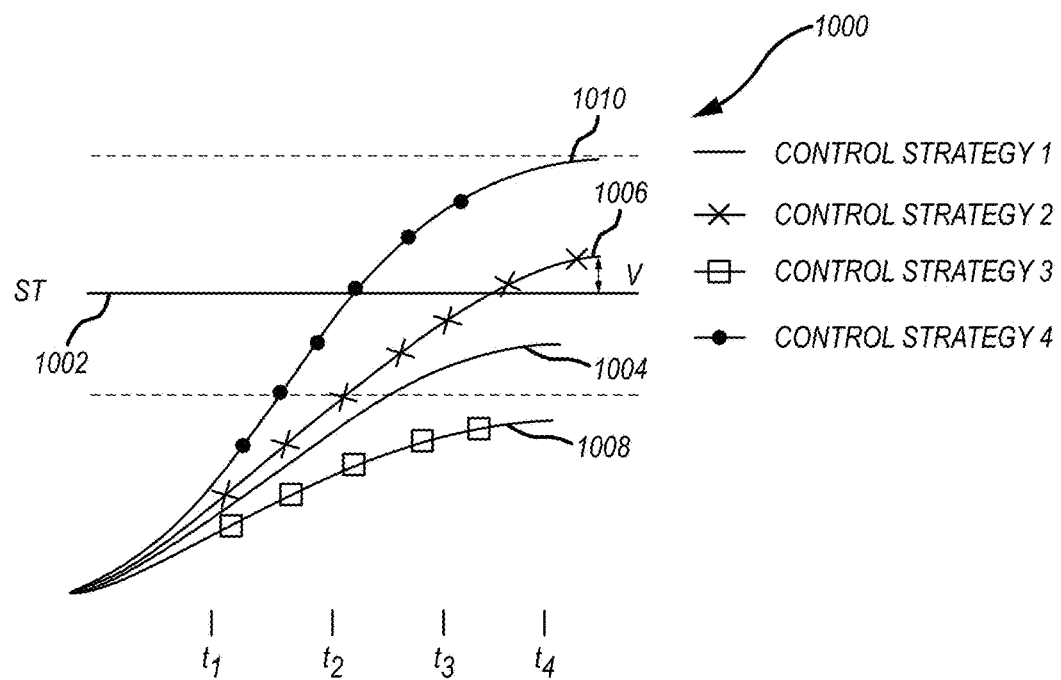
FIG. 10 illustrates predicted ambient temperature trajectories that may be calculated by a predictive control algorithm, according to one embodiment.

Referring now to FIG. 10, in predicting a temperature response to a radiant heating operation, the predictive control algorithm may evaluate a set of candidate control strategies (hereinafter control strategies) that may be used in controlling the radiant heating system (see FIGS. 17-19). Each control strategy may include a plurality of binary-valued time steps $t_1$-$t_n$ (i.e., 1 or 0) that define when an HVAC system is cycled on and off (hereinafter time steps or control intervals). The time steps $t_1$-$t_n$ may have a time or duration interval, which in some embodiments is approximately 5 minutes, 10 minutes, 15 minutes, 20 minutes, and the like, although 10 minute duration may be preferred to minimize noise and/or head unit wake up.

The binary-valued control strategies may have an overall on-time percentage, which refers to a percentage of time the HVAC system is cycled on during a "predefined control duration" or a total duration for the control strategy (hereinafter control strategy duration). For example, if the control strategy duration is approximately 1 hour and the HVAC system is cycled on for 30 minutes, the overall on-time percentage would be approximately ½. The control strategy duration may be approximately 30 minutes, 1 hour, 2 hours, and the like, although a duration of 1 hour may be preferred to minimize noise and/or head unit wake up. As described in more detail below, each control strategy may be constrained to have a minimum number of on-time cycles that achieve the candidate overall on-time percentage (e.g., 1 on-time cycle for a $\frac{1}{6}^{th}$ on-time percentage, 2 on-time cycles for a $\frac{1}{3}^{th}$ on-time percentage, 3 on-time cycles for a $\frac{1}{2}$ on-time percentage, and the like). The control strategy may also define a "control trajectory" or ambient temperature trajectory 1004-1010, which refers to a predicted trajectory of an ambient temperature of the enclosure due to a respective defined control strategy heating operation.

Based on the determined average Lag values, a simple temperature prediction 1000 may be calculated for an HVAC system based on each of the control strategies. For example, a simple temperature prediction may be calculated for each time step of one or more control strategies. The control or ambient temperature trajectory 1004-1010 may then be determined based on the predicted temperatures for each of the control strategies. The ambient temperature trajectory 1004-1010 for each control strategy may be evaluated or processed in view of a predetermined assessment functions (hereinafter a cost function) to select an optimal control strategy. The optimal control strategy may be selected according to one or more predetermined assessment criteria, such as minimizing a cost value as described below. Minimizing a cost value may essentially involve determining which ambient temperature trajectory 1004-1010 has the least amount of total variance V from a setpoint temperature ST.

The cost value may be calculated based on the difference between the setpoint or target temperature ST and predicted temperature of each time step $t_1$-$t_n$ of a given control strategy. According to some embodiments, the cost value for the control strategy may be the sum of the target temperature minus the predicted temperature at each time step $t_1$-$t_n$ squared as shown below:

$$\text{Cost} = \sum_0^X (T(k)_{target} - T(k)_{predicted})^2$$

As described below, the cost function for multiple control strategies may be calculated and the control strategy with the lowest value may be selected as the most appropriate control strategy to use to heat the enclosure. Stated differently, the cost function may be minimized to determine the most appropriate heating operation to perform. In some embodiments, the cost function may be weighted so that the calculated cost value is more heavily influenced by future time step temperature predictions that are more likely to be closer to or farther away from the setpoint or target temperature ST and, thus, more likely to estimate overshooting or undershooting. For example, a weight factor varying between 0 and 1 (Wt(k)) for time step k may be multiplied by the difference between the target temperature ST and predicted temperature squared at time step k. Thus, control strategies having future temperatures with larger target and predicted temperatures variances V will have a greater cost and less likelihood of being selected.

$$\text{Cost} = \sum_0^X Wt(k)(T(k)_{target} - T(k)_{predicted})^2$$

The minimized cost function may approximate the least amount of overshooting and undershooting to occur for a given control strategy since overshooting and undershooting will be reflected in the cost equation by the difference in the predicted and target temperatures ST. As stated above, future time steps $t_1$-$t_n$ are more likely to represent undershooting or overshooting and may be appropriately weighted to influence the cost function. In some embodiments, such as when the system does not have enough heating data for a home or the Lag value is very short (e.g., less than 10 or 20 minutes), minimizing the cost function may result in a prediction that predictive controls should not be used. In such embodiments, the system may switch to conventional bang-bang controls and a conventional maintenance band and offset value (e.g., ±0.7 degrees) may be used.

Prediction Model

To predict the temperatures at each of the time steps described previously, a parameterized model (hereinafter prediction model) may be used that predicts a temperature change dT(i) for each time step. The prediction model may be based on historical ambient temperatures for the enclosure acquired by the thermostat during associated historical periods in which radiant heat control was actuated. This historical data may be stored on various memory device including both internal and external (i.e., cloud) devices or servied. For example, in one embodiment, the prediction model is based on a regression analysis of one or more independent variables, with the temperature change dT(i) being the dependent variable. In a specific embodiment, the regression analysis may use two independent variables (e.g., radiant heat and solar radiance), although in other embodiments, 3 or more independent variable may be used (e.g., outside temperature, humidity, and the like). An exemplary prediction model is shown below.

$$dT(i) = a0 + a1 * SR(i) + a2 * \Sigma(\text{Activation}(k) * u\_heat(i-k))$$

In the above equation, the a0, a1, and a2 are regression coefficients that are obtained by a least square fit of historical numerical data points, which calculation may be conducted at repeated intervals, such as every month, every week, every day (e.g., midnight), and the like. The data points may include, among other things, the temperature T, the change in temperature dT, the heat applied u_heat, and the like, which may be recorded at each time step within a defined period, such as within 24 hours, 1 week, 1 month, and the like. A least square fit of these historical data points may be obtained to determine the regression coefficients (i.e., a0, a1, and a2). In some embodiments, the historical data and least square fit calculation may be configured to more heavily weigh or consider data points that were recently obtained (e.g., data points obtained within the last week or several days). As described in more detail below, the prediction model includes predetermined response trajectories (hereinafter functions), such as SR(i) for solar radiation, Activation (k) for an activation function, and u_heat for a heat input response. These functions are weighted by the regression coefficients, which are calculated by fitting a model on historical data. The regression coefficients may increase as the measured significance of the corresponding function increases or decrease as the measured significance of the corresponding function decreases.

According to the above prediction model, the regression coefficient a0 represents a constant, which is typically a negative value to show that in the absence of heating factors (e.g., solar radiance SR and radiant heating), the change in temperature dT will be negative. Stated differently, a negative regression coefficient a0 ensures that the estimated temperature T will drop in the absence of a heat source as would be expected. SR(i) represents a function that approximates or accounts for solar irradiance as described below. Activation(k) represents a function that weighs or accounts for previous radiant heating inputs (u_heat) in predicting a current change in temperature. According to this model, previous radiant heating inputs (u_heat(i-Lag)) typically have the most effect on temperature change dT(i). In some embodiments, the current heating input, u_heat(i) and the oldest heating input, u_heat(i-2*Lag) may have less of an effect on temperature change dT(i), although the model may be adjusted if these inputs are determined to be more significant. k is the time length of the activation function, which may range from 1 to 2*Lag as described in the model below, or may vary depending on the model used. Activation (k) smoothens the heater inputs (u_heat), while delaying its effect, which may simulate the thermal mass or inertia of the enclosure. From the above temperature change equation dT(i), the temperature T at any given time step may be determined from the equation below.

$$T(i+1)=T(i)+dT(i)$$

In this equation, T(i) is the temperature at time step i. dT(i) is the predicted changing in temperature at any time step i. T(i+1) is a predicted temperature at a subsequent time step, which is equal to the temperature at time step i plus the change in temperature dT(i). According to one embodiment, the time step duration (e.g., i, i+1, etc.) may be about 10 minutes. 10 minutes time step intervals have been determined to reduce noise in the calculation while reducing power and calculation requirements and allowing the head unit to remain asleep.

Figure 11:
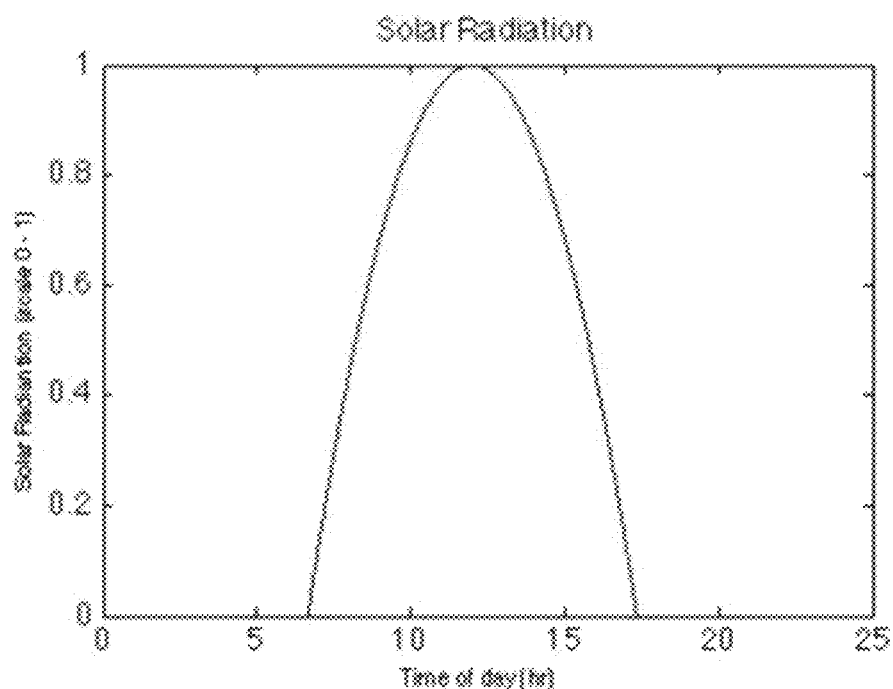
FIG. 11 illustrates a model of a solar radiation curve, according to one embodiment.

The solar radiation may be modeled as a curve as shown in FIG. 11. The solar radiation may be modeled to predict how much the solar radiation affects the enclosure's ambient temperature. For example, between a period of 0-6 hours (e.g., midnight to 6 a.m.) the modeled effects of solar radiation are zero to show that the sun has not yet risen and, thus, the enclosure is not yet affected by solar radiance. Between the period of 6-18 hours, the model rises from zero to one and back to zero showing that as the sun travels overhead, the solar radiance becomes more intense and then less intense on the enclosure (a solar radiance of 1 represents full solar radiance), which predictively leads to an increase in ambient temperature. Between the period of 18-24 hours, the modeled effects are once again zero to show that the sun has set.

As shown in the solar radiance model, the curve rises and falls sharply and tapers toward the middle, which implies that radiance effects may be felt quickly in the day (e.g., by 10 a.m.) and felt roughly throughout the day. The shape of the solar radiance model may be adjusted to more fully represent the location of the home. For example, the model curve may have different shapes or be skewed to show relatively stronger solar radiance effects in the morning or evening. The solar radiance hours may be extended based on the latitude or longitude of the location, and the like. In one embodiment, the temperature rise of an enclosure may be monitored and measured throughout the day to establish and/or adjust a solar radiance model and thereby tailor the model to the specific enclosure. In this manner, the solar radiance model may be unique to the specific enclosure and/or location to account for trees, landscaping, surrounding homes or buildings, and the like, that may affect solar radiance temperatures. The solar radiance model may also be dependent on current environmental conditions or the time of year, such as if cloud cover is present, if it is raining or snowing, or if the heating operation is occurring in the fall or winter. In other embodiments, solar radiation effects may be modeled with other shapes including a triangle, and the like.

Figure 12:
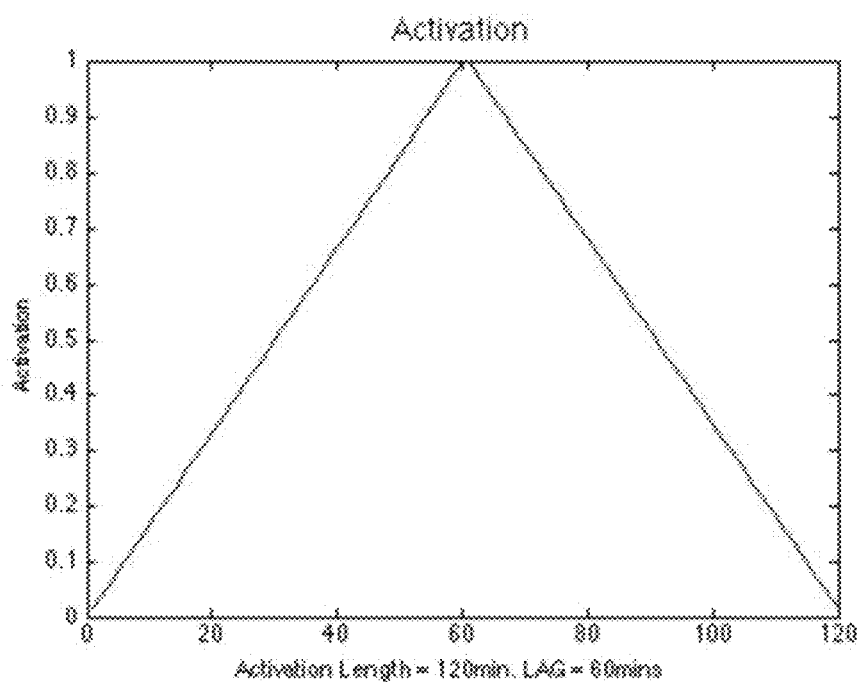
FIG. 12 illustrates a triangular model of an activation function, according to one embodiment.

Similarly, the activation function described above may be modeled to show and facilitate calculating the effects of radiant heater inputs before and/or after a given time step. For example, as shown in FIG. 12, the activation function may be modeled as a triangle showing the increase in temperature effects resulting from operation of the radiant heater. In other embodiments, the activation function may be modeled as various other shapes including curves, parabolas, Gaussian, and the like. These additional shapes may be dependent on the specific heated enclosure, the location of the enclosure, and the like, and may more precisely capture the thermal mass or inertial effects for the enclosure.

Figure 13:
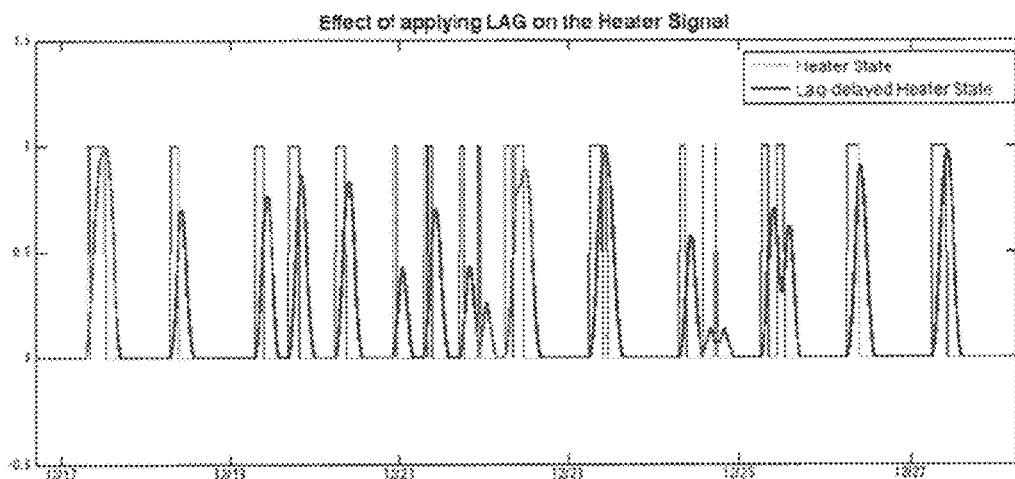
FIG. 13 illustrates a graph showing modeled effects of Lag-delayed heating versus a radiant heater state based on the activation function of FIG. 12, according to one embodiment.

In some embodiments, the modeled activation function may include a range of up to two times the Lag value to account for residual heating effects that occur after radiant heating is discontinued. For example, FIG. 12 is modeled for a system with a Lag of approximately 60 minutes and time steps of 10 to 20 minutes (the model illustrates 20 minute intervals). The model shows that when radiant heating is started (i.e., time=0 or k=0) no radiant heating effects are felt (i.e., activation of 0). After 60 minutes (i.e., k=60) the full effects of radiant heating are felt (i.e., activation of 1) since the time is equivalent to the Lag value. Time periods longer than 60 minutes (i.e., 60 minutes to 120 minutes) represent residual effects of radiant heating that occur due to system inertia. An activation length of 120 minutes (i.e., k=120) returns k to zero as at this point predictively no radiant heating is occurring. A graph showing modeled effects of Lag-delayed heating versus a radiant heater state based on activation function of FIG. 12 is shown in FIG. 13, which shows that heating effects continue to be felt even after a radiant heater is turned off.

In effect, the summation function shown above is a convolution of heater input signals and the activation function model, which predicts the impacts of radiant heating at any given time step. The summation function may be in effect a simple autoregressive moving average model that does not require the calculation or storage of large amount of previous radiant heat data, which otherwise may require large computation and/or power requirements that may not be available on a power limited thermostat. The Lag value in effect may convolve the previous radiant heat inputs into a single value, which makes the summation function more manageable to calculate and reduces the power requirements.

As mentioned previously, the activation model is dependent on the Lag that is calculated for the heated enclosure as described above and, thus, a value of 60 minutes for Lag is merely illustrative and will typically vary according to the individual heated enclosure characteristics. Also, as described above, the Lag value may vary depending on the time of day or one or more other environmental or enclosure conditions. As such, the activation function may be specific to the time of day or one or more other environmental or enclosure conditions. Similarly, the activation function need not be triangular in shape and may comprise various other shapes that may provide a better approximation of the enclosure.

Figure 14:
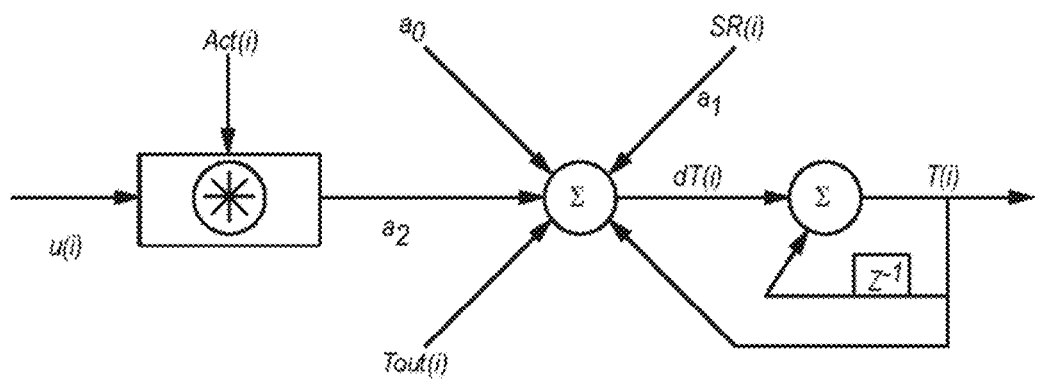
FIG. 14 illustrates a predictive control algorithm in control system form, according to one embodiment.

FIG. 14 represents the above equation in control system form. As shown in FIG. 14, in some embodiments, the above described equation may include a third variable (Tout) that represents the effects of the outside temperature, such as due to thermal transfer through the walls, which may be weighted by an additional regression coefficient in a manner similar to that described herein. As can be appreciated by those skilled in the art, the regression coefficients (e.g., a0, a1, a2, and the like) that are obtained via a least square fit to approximate the heating effects on specific enclosures. For example, if the enclosure's insulation is good, the corresponding coefficients for solar radiance and/or outside temperature will be low, showing that the enclosure's heat change is due mainly to radiant heating. Similar results would occur if the solar radiance or outside temperature were determined to have a greater or more significant impact on the enclosure's temperature. The above equation allows the predictive controls to be tuned to the specific enclosure being heated. Although not shown, the model could include other variables to account for humidity, rain, snow, elevation, and the like, which may each be weighted depending on the significance of the variable. The enclosure could also average temperature readings from various sensors positioned within the enclosure. For example, radiant heat often radiates from the floor. As such, floor sensors may be used to determine when the floor is close to the setpoint temperature in order to turn the thermostat on and off.

Figure 15:
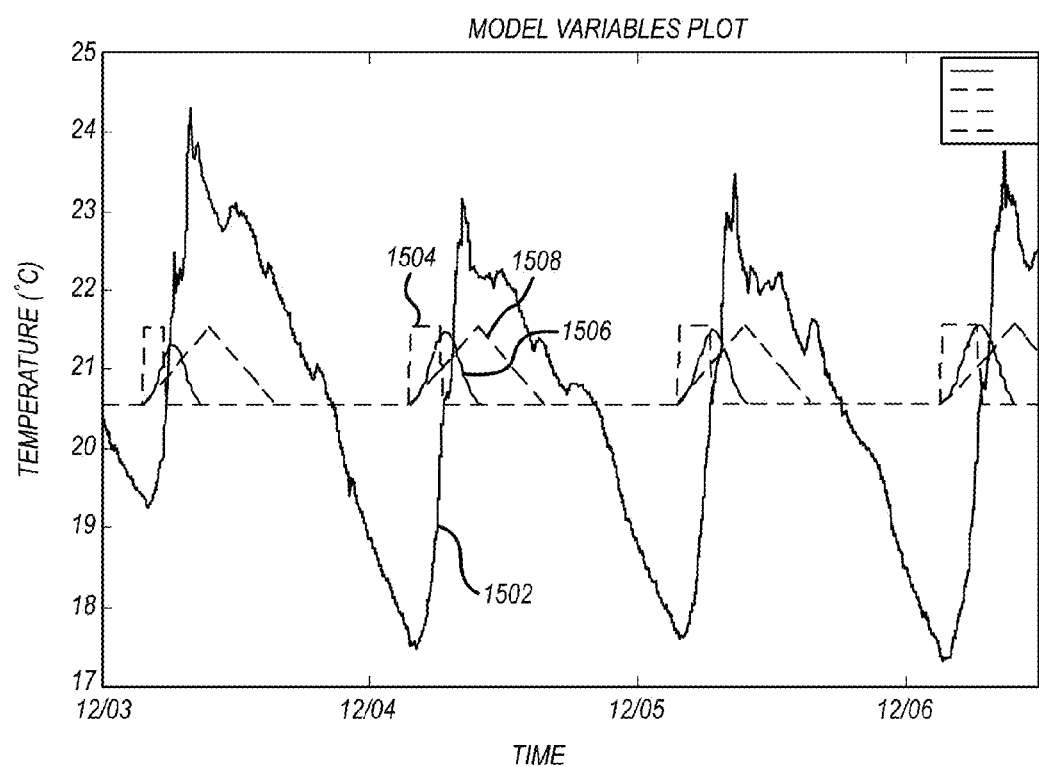
FIG. 15 illustrates a calculation of a temperature variation in an enclosure using a prediction model equation, according to one embodiment.

FIG. 15 shows a calculation of the temperature variation in an enclosure using the above described prediction model equation. 1502 represents the temperature swing in the enclosure, 1504 represents the radiant heat applied, 1506 represents the delayed or lag-compensated heat, which is a convolution of the applied heat and the activation function. 1508 represents the solar radiance heat effect.

As previously described, the predictive model may be "fit" with the historical numerical data points on a periodic basis, such as every midnight, to obtain the regression coefficients a0, a1, a2, and the like. A "goodness of fit" may also be calculated for the predictive model, which represents the how well the model represents the variance in temperature for the enclosure. The goodness of fit typically varies between 0 and 1 with higher numbers representing a closer fit of the model with the historical data. In some embodiments, the predictive model may only be used if the goodness of fit is above some minimal threshold, such as above 0.5. If the goodness of fit is below this minimal threshold, the system may default to conventional bang-bang controls. Additional checks may be performed on the predictive model and the historical data points. For example, a sign of the coefficient for solar radiation (i.e., ±) may be checked to ensure that the sign is positive, which implies a temperature rise due to solar radiation. If the sign is negative, which would imply a temperature drop due to solar radiation effects, the model may be rejected. Outlier data points of the historical data may also be detected and rejected in some embodiments.

Figures 16, 17, 18, 19:
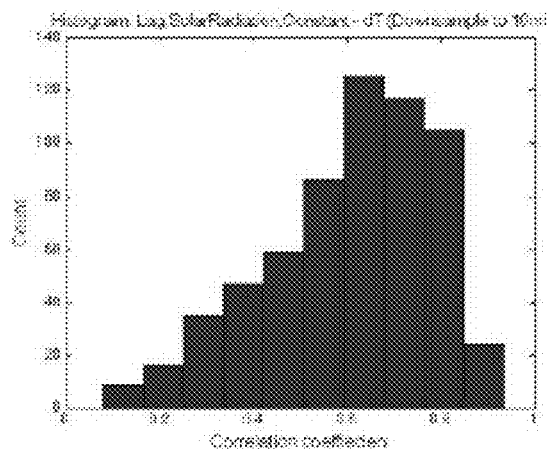
FIG. 16 illustrates a histogram of a calculated fit for approximately 600 thermostat devices over a two month period, according to one embodiment.
FIG. 17 illustrates a defined subset of control strategies that may be used when an ambient temperature measurement is below a lower maintenance band threshold, according to one embodiment.
FIG. 18 illustrates a defined subset of control strategies that may be used when an ambient temperature measurement is above an upper maintenance band threshold, according to one embodiment.
FIG. 19 illustrates a defined subset of control strategies that may be used when an ambient temperature measurement is within maintenance band, according to one embodiment.

FIG. 16 shows a histogram of the calculated fit for approximately 600 thermostat devices over a two month period (December and January). The thermostats were operating heaters with a lag of 30 minutes or more and at least 2 weeks of contiguous data was considered. As shown in the histogram, 75% of the considered devices achieved the 0.5 minimum threshold, which indicates improved heating operations using the described predictive controls. In other embodiments, the goodness of fit may be used to determine the width of the maintenance band as described below.

The above equation simplifies more complex predictive control equations, such as an ARMA (autoregressive moving average) equation, into an equation that can easily be programmed on the power limited thermostat device. It also vastly reduces the computing power required to make the temperature change prediction. Further, the Lag factor reduces the overall number of inputs that must be considered to make a temperature change prediction by combining previous heat input effects into a single variable, which would otherwise need to be individually computed.

Control Algorithm

The control algorithm uses the above described predictive model to predict the temperatures at each of the time steps. The control algorithm also determines a control strategy based on a minimization of a cost function as previously described. In essence, the control algorithm calculates both an amount of time for the HVAC system to remain on and a time for the head unit to wake up to reassess its operating state or condition. By iteratively running the prediction model over a defined amount of time steps or control intervals (e.g., 6 time steps over 60 minutes), a control strategy may be chosen, such that it minimizes overshoots and/or undershoots, while keeping the HVAC state changes to a minimum. The chosen control strategy is implemented and the process repeats every time the head unit wakes up to reevaluate the control strategies. Accordingly, even if an incorrect prediction is made and a less than desirable control strategy is chosen, the system may reevaluate its situation and correct the control strategy when it wakes up, which may be due to an anticipated wake up time, crossing a maintenance band, activation of a proximity sensors, or for some other reason.

In some embodiments, the number of control strategies that are calculated or predicted may be reduced to a defined subset (i.e., a set of candidate control strategies). The defined subset of control strategies considered may further depend on whether the ambient temperature is below the lower maintenance band threshold, above the upper maintenance band threshold, or within the maintenance band. The defined subset of control strategies may minimize the number of times the radiant heater is cycled on and off, which is preferred when using radiant heating systems. Specifically, the defined subset of control strategies may be selected so that only a single state or transition occurs in a given sequence of heater control actions, or so that the radiant heating system does not cycle on more than twice in a given control duration. A limit may also be placed on how quickly the state of the heater can transition from one state to another. For example, in one embodiment, the heater may be required to remain on or off for 20 minutes or more to reduce on/off cycle transitions. The defined subset of control strategies may be further reduced based on the limit of how quickly the system may transition between on/off states as described below. The defined subset of control strategies further minimizes the computations required and, thus, reduces the computational and/or power requirements for the control system.

FIG. 17 illustrates a defined subset of control strategies (i.e., a set of candidate control strategies) that may be considered when the ambient temperature is below a lower maintenance band threshold. Specifically, FIG. 17 shows 6 control strategies that may be considered, although more or less control strategies may be considered in other embodiments. The control strategies are binary-valued, meaning that the inputs are either 1 or 0 where an input of 1 represents an HVAC on-time cycle and an input of 0 represents an HVAC off-time cycle. Accordingly, the first control strategy considers a single heater on-time cycle at a first time step (i.e., i) followed by five consecutive off-time cycle. The first control strategy has an overall on-time percentage of approximately ⅙. In contrast, the sixth control strategy considers six consecutive heater on-time cycles at six consecutive time steps (i.e., time step i to i+5) for an overall on-time percentage of approximately 1. The intervening control strategies (i.e., 2-5) each consider a single additional heater on-time cycle for an additional time step relative to the previous control strategy. As described above, the time steps may be some defined period of time, such as 5 minutes, 10 minutes, 20 minutes, and the like.

According to one embodiment, the defined subset of control strategies may be further reduced based on a defined limit as to how quickly the heater may transition between on-time and off-time cycles. For example, if the time steps are defined as 10 minutes and the heater is limited to maintaining a current cycle for at least 20 minutes, the first control strategy will not be considered in the cost minimization function unless the heater was already on.

The cost function described above, which may or may not include the weight factor, may be minimized to determine the most appropriate control strategy to use. Based on the chosen control strategy, the current heater state is determined (i.e., on-time or off-time cycle) and a wake up time for the head unit is determined based on the time step duration and the number of time steps required until a state transition is anticipated. For example, if the third control strategy is chosen based on minimizing the cost function, the heater will transition or remain on and the wake up time will be determined to be approximately 30 minutes for time step durations of 10 minutes (i.e., 3 times steps*10 minute duration for each time step). The system will reassess its situation when it wakes up after the anticipated duration to determine if additional heating is required. If the system wakes up for any reason before the anticipated duration, the system will likewise reassess its situation.

In some embodiments, the system may automatically remain on whenever the system is outside the maintenance band. For example, as shown in FIG. 17, for each control strategy, the heater input at time i is always 1 meaning the heater will remain on as long as the ambient temperature is below the lower maintenance band threshold. When the ambient temperature crosses the lower maintenance band threshold, however, the selected control strategies may change, which allows for the heater input to cycle off. The above defined subset of control strategies may again be considered when the ambient temperature drops below the lower maintenance band threshold.

Similarly, the system may automatically cycle off when the ambient temperature crosses the upper maintenance band threshold even if the anticipated wake up time has not occurred. For example, if the predicted temperature rise was inaccurate and the temperature rise was greater than anticipated so that the ambient temperature rises above the upper maintenance band threshold, the system will wake up and turn the heater off to prevent further heating of the enclosure. In this manner, the conventional bang-bang control may function as a backup control to ensure that too little or too much heating does not occur.

FIG. 18 illustrates a defined subset of control strategies that may be considered when the ambient temperature is above the upper maintenance band threshold. As shown in FIG. 18, a first control strategy considers heater off-time cycles at six consecutive time steps (i.e., time step i to i+5) for an overall on-time percentage of 0. In contrast, the sixth control strategy considers a single heater off-time cycle at a first time step (i.e., i) followed by five consecutive heater on-time cycles for an overall on-time percentage of approximately 5/6. The intervening control strategies (i.e., 2-5) each consider an additional heater on-time cycle occurring for an additional time step relative to the previous control strategy. As described previously, the defined control strategy may be further limited when a cycle on/off limit so dictates such as to avoid cycling the heater on/off after a previous cycle transition.

The cost function may be minimized to determine the most appropriate control strategy and the current heater state (i.e., on or off) and wake up time may be determined as described above. The system will reassess its situation when it wakes up to determine if the heater should transition on or remain on. In some embodiments, the system may automatically remain off whenever the system is outside the maintenance band. For example, as shown in FIG. 18, the heater input at time i is always 0 meaning the heater will remain off as long as the ambient temperature is above the upper maintenance band threshold. When the ambient temperature crosses the upper maintenance band threshold, however, the control strategies may change to allow the heater input to cycle on. The above defined subset of control strategies may again be considered when the ambient temperature rises above the upper maintenance band threshold. Similarly, the system may automatically cycle on when the lower maintenance band threshold is crossed even if the anticipated wake up time has not occurred. As described above, this may be useful when the predicted temperature drop is inaccurate and the temperature drop is greater than anticipated.

Since in some embodiments, the heater function will not cycle off until the lower maintenance band threshold is crossed and similarly will not cycle on until the upper maintenance band threshold is crossed, it should be appreciated that in these embodiments it may be desirable to widen the maintenance band (i.e., increase the maintenance band offset value) to allow the heater to more quickly cycle on and off. Accordingly, in some embodiments, the maintenance band threshold value may be increased and the maintenance band widened based on how well the above described prediction model represents the variance in temperature for the enclosure. For example, the maintenance band threshold may be based on the calculated goodness of fit for the predictive model. When the goodness of fit is relatively high showing that the predictive model represents the temperature variance well, the maintenance band may be widened and the maintenance band threshold increased. Likewise, when the goodness of fit is relatively low showing less of a correlation between the prediction model and the temperature variance, the maintenance band may be narrowed and the maintenance band threshold decreased.

In one embodiment, when the goodness of fit is above 0.7, the maintenance band threshold may be set at ±1.5 degrees Fahrenheit from the setpoint temperature. When the goodness of fit is between 0.5 and 0.7, the maintenance band threshold may be set at ±1.0 degrees Fahrenheit from the setpoint temperature. When the goodness of fit is between 0.3 and 0.5, the maintenance band threshold may be set at ±0.7 degrees Fahrenheit from the setpoint temperature, which represents a threshold typically used by conventional bang-bang controls. If the goodness of fit is below 0.3, the system may determine that the predictive controls should not be used and conventional bang-bang controls may be used.

FIG. 19 illustrates a defined subset of control strategies that may be considered when the ambient temperature is within the maintenance band. The control strategies shown in FIG. 19 may essentially be a combination of the control strategies described in FIGS. 17 & 18. The control strategies of FIG. 19, however, allow the heater to either cycle on or off without crossing a temperature threshold. For example, if the ambient temperature is within the maintenance band, the thermostat may determine a strategy that involves some amount of heating (i.e., strategies 2-5 & 8-12), an entire heating cycle (i.e., strategy 7), or no amount of heating (i.e., strategy 1) and is not limited to an either on-time cycle or off-time cycle until a temperature threshold is crossed. Further, the thermostat may determine to apply heating early in the control duration (i.e., strategies 7-12) or later in the control duration (i.e., strategies 1-6). As described previously, the defined control strategy may be further limited when a cycle on/off limit so dictates such as to avoid turning the heater on after a previous off transition.

The cost function may be minimized to determine the most appropriate control strategy and the current heater state (i.e., on or off) and wake up time may be determined as described above. The system will reassess its situation when it wakes up to determine if the heater should transition on or off, or remain in a current state.

In some embodiments, the system may also determine which control option is most appropriate for heating a home. For example, the system may evaluate whether a bang-bang control, as described herein, or a predictive control is more likely to provide a desired result.

The above described, some portion of the above described operations, or substantially all the operations, may be performed on either the head unit processor or the backplate processor. In some embodiments, the predictive temperature calculations, cost function minimization, and the like may be performed by the head unit processor since this processor is typically more powerful. The determined wake up time and/or on/off condition of the HVAC system may then be passed to the backplate processor for monitoring and wake up purposes. The backplate may wake up the head unit at the determined wake up time or for any other reason and the head unit may reevaluate its state and perform a state transition if necessary, or calculate and select another control strategy.

In some embodiments, the calculation described herein may be determined each time the head unit wakes up. The head unit may be awoken for various reasons, such as to look at a future setpoint, in response to a temperature adjustment by a user, based on crossing a lower or upper maintenance band, based on a defined change of state (e.g., turning a heating operation on or off based on the predictive control), and the like. For example, based on a selected predictive control with a lowest cost value, it may be determined to wake the head unit up after twenty minutes of heating. Upon waking the head unit up after this twenty minute time interval, the head unit may perform the calculations described herein and minimize a cost value to determine if additional heating is appropriate or if the heating operation should be terminated. The head unit may likewise be woken up and a calculation performed to determine if heating should begin or if the HVAC unit may remain off. If the head unit is awoken for any other reason (e.g., a proximity sensor is tripped, and the like), the above described calculations may be performed to adjust the heating control strategy and/or minimize cost functions for various heating strategies.

In some embodiments, the radiant features described herein may be implemented as default systems in the thermostat. For example, a user may identify a home's heating as radiant, in which the predictive control algorithms described herein would be automatically applied. In some embodiments, the user may opt out of using the radiant heating algorithms by selecting an appropriate on/off button or feature that disables the predictive control algorithm. According to another embodiment, the user may be prompted to enable or disable the radiant heating features described herein, or may otherwise be required to enable these features before they are applied.

Exemplary Methods

Figure 20:
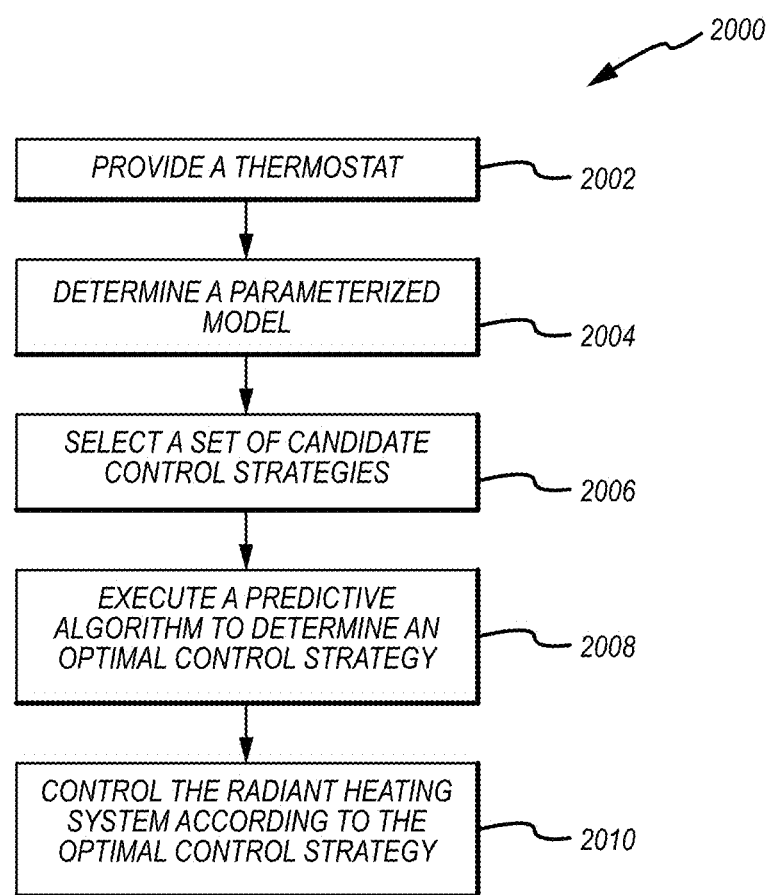
FIG. 20 illustrates a method of controlling a thermostat using a model predictive control, according to one embodiment.

Referring now to FIG. 20, illustrated is a method 2000 of controlling a thermostat using a model predictive control. At block 20002, a thermostat is provided. As described herein, the thermostat may include a housing, a memory, and a processing system disposed within the housing. The processing system may be in operative communication with one or more temperature sensors to determine an ambient temperature in an enclosure and may be in operative communication with the memory. The processing system may also be in operative communication with a radiant heating system to heat the enclosure via radiant heating so that the ambient temperature is near a setpoint temperature.

At block 2004, a parameterized model is determined from which a predicted value for the ambient temperature of the enclosure responsive to a candidate radiant heating control strategy may be determined. The parameterized model may be based on historical ambient temperatures for the enclosure acquired by the thermostat during associated historical periods in which radiant heat control was actuated by the thermostat and stored in the memory. At block 2006, a set of candidate control strategies may be selected for use in controlling the radiant heating system. Each candidate control strategy may be a binary-valued control trajectory having a candidate overall on-time percentage over a predefined candidate control duration. Further, each candidate control strategy may be constrained to have a minimum number of on-time cycles that achieves the candidate overall on-time percentage.

At block 2008, a predictive algorithm may be executed to determine an optimal control strategy from the set of candidate control strategies. According to one embodiment, executing the predictive algorithm may include: applying each candidate control strategy to the parameterized model to predict a corresponding ambient temperature trajectory, and processing each corresponding ambient temperature trajectory in view of one or more predetermined assessment functions to select an optimal candidate control strategy according to one or more predetermined assessment criteria. At block 2010, the radiant heating system may be controlled according to the selected optimal control strategy.

The method may also include determining whether the model predictive control provides enhanced control of the radiant heating system relative to an additional control method prior to using the model predictive control. If enhanced control is not provided, the thermostat may determine to use conventional control methods, such as bang-bang controls. The method may further include determining a Lag value that represents an amount of thermal mass or inertia for the enclosure. In one embodiment, the one or more predetermined assessment functions may include a cost function, in which a cost is increased as an ambient temperature trajectory of a respective candidate control strategy deviates from the setpoint temperature.

In some embodiments, the on-time cycles and off-time cycles may have intervals of not less than 10 minutes. Such intervals may minimize noise and/or reduce cycle on/off transitions and/or head unit wake up occurrences. The parameterized model may include predetermined response trajectories, and the method may additionally include determining weighting coefficients for the predetermined response trajectories. In one embodiment, the parameterized model may be based on a combination of historical solar radiation and a radiant heating response data acquired during associated historical periods. In such embodiments, applying each candidate control strategy to the parameterized model may include using a solar radiation function and a radiant heating response function to predict the corresponding ambient temperature trajectory.

In another embodiment, the parameterized model may be based on historical outside temperature data acquired during associated historical periods and applying each candidate control strategy to the parameterized model may include using forecasted temperature data to predict the corresponding ambient temperature trajectory. In some embodiments, the method may additionally include limiting a cycle transition of the radiant heating system while the ambient temperature is outside a defined maintenance band threshold associated with the setpoint temperature. The method may further include adjusting an offset value of a maintenance band that defines an upper threshold temperature and a lower threshold temperature relative to the setpoint temperature based on a confidence that the parameterized model characterizes the historical ambient temperature data.

Figure 21:
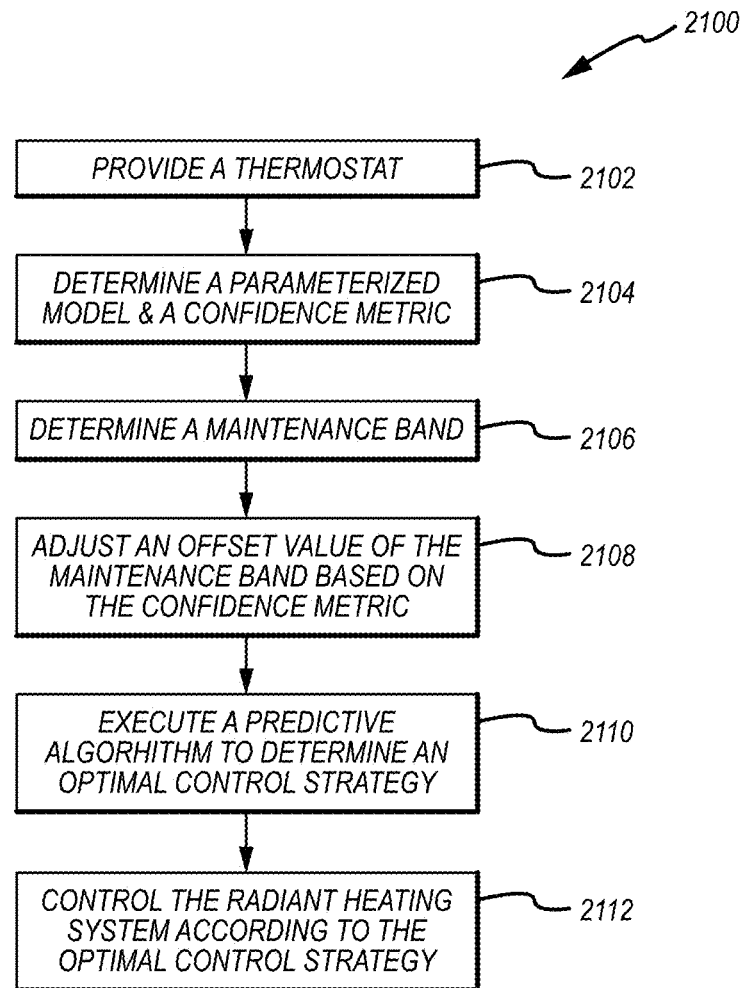
FIG. 21 illustrates a method of controlling a thermostat, according to one embodiment.

Referring now to FIG. 21, illustrated is a method 2100 of controlling a thermostat. At block 2102, a thermostat may be provided. The thermostat may include a housing, a memory, and a processing system disposed within the housing as described herein. At block 2104, a parameterized model may be determined from which a predicted value for the ambient temperature of the enclosure responsive to a candidate radiant heating control strategy may be determined. The parameterized model may be based on historical ambient temperatures for the enclosure acquired by the thermostat during associated historical periods in which radiant heat control was actuated by the thermostat and stored in the memory. The parameterized model may also have a first confidence metric associated with it.

At block 2106, a maintenance band may be determined for operation of the radiant heating system. The maintenance band may have an offset value that defines an upper threshold temperature and a lower threshold temperature relative to a setpoint temperature. The upper threshold temperature and a lower threshold temperature may be used in controlling on-cycle and off-cycle transitions of the radiant heating system. At block 2108, the offset value may be adjusted based on the first confidence metric such that the offset value is greater if the first confidence metric is large, and the offset value is smaller if the first confidence metric is small.

At block 2110, a predictive algorithm may be executed to determine an optimal control strategy from a set of candidate control strategies. According to one embodiment, the predictive algorithm may be executed by applying each candidate control strategy to the parameterized model to predict a corresponding ambient temperature trajectory. AT block 2112, the radiant heating system may be controlled according to the determined optimal control strategy using the maintenance band.

Figure 22:
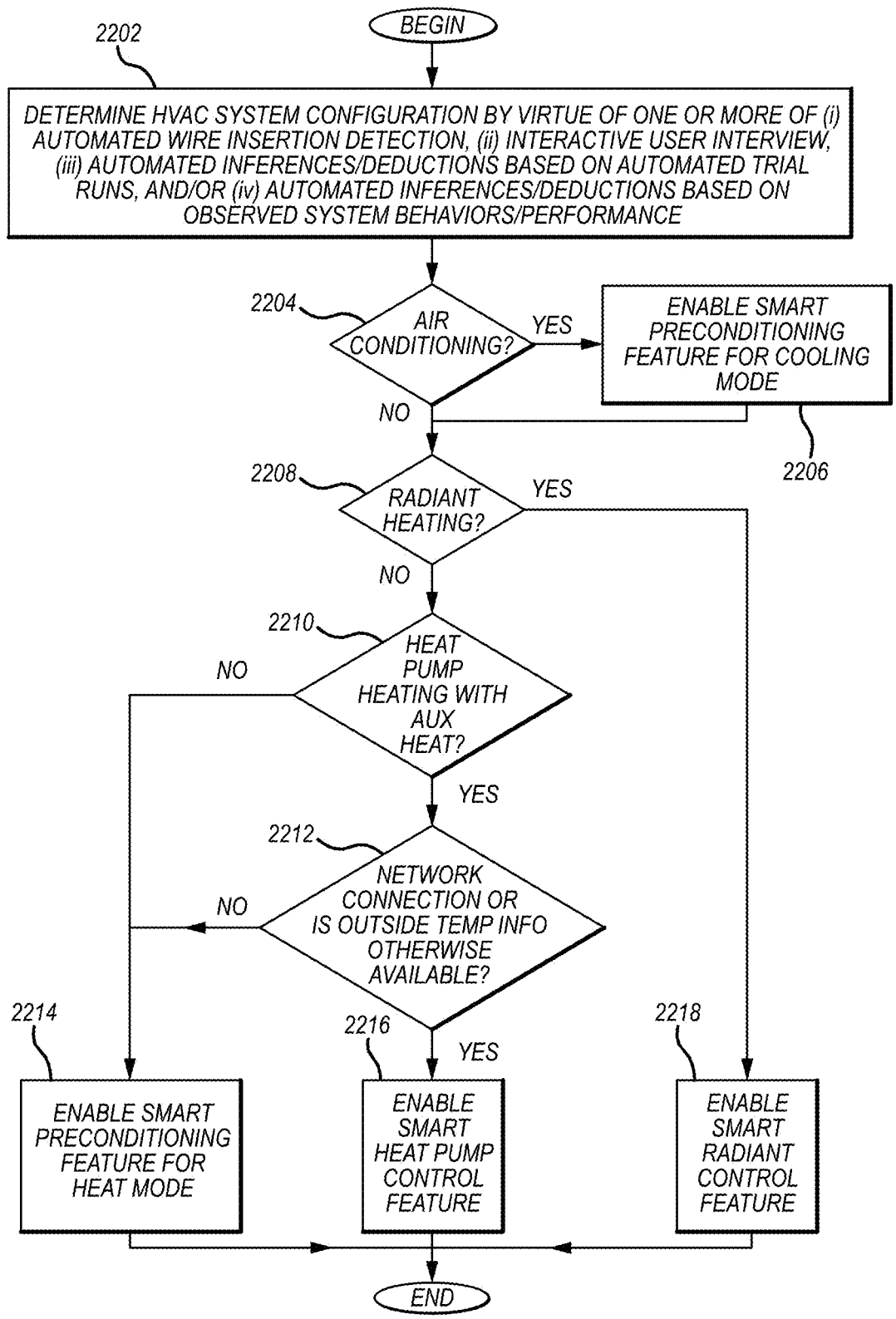
FIG. 22 illustrates steps for automated system matching, according to one embodiment.

FIG. 22 illustrates steps for automated system matching that are preferably carried out by the same thermostat or thermostatic control system that carries out one or more of the other HVAC control methods that are described in the instant patent specification. It has been found particularly desirable to make thermostat setup and governance as user-friendly as possible by judiciously automating the selection of which among a variety of available energy-saving and comfort-promoting control algorithms are appropriate for the particular HVAC configuration of the home in which the thermostat is installed. At step 2202, the HVAC system features available for control by the thermostat are determined by virtue of at least one of (i) automated wire insertion detection, (ii) interactive user interview, (iii) automated inferences or deductions based on automated trial runs of the HVAC system at or near the time of thermostat installation, and (iv) automated inferences or deductions based on observed system behaviors or performance. Examples of such methods are described in one or more of the commonly assigned US20120130679A1 and US20120203379A1, as well as U.S. Ser. No. 13/632,148, supra.

In relation to cooling mode operation, if it is determined that the HVAC system includes air conditioning (step 2204), which may be by virtue of a dedicated air conditioning system and/or a heat pump operating in the cooling direction, then at step 2206 there is enabled a smart preconditioning feature for cooling mode operation. One example of a particularly advantageous smart preconditioning feature is described in U.S. Ser. No. 13/632,150, supra. For some embodiments, the smart preconditioning algorithm is configured to: constantly learn how fast the home heats up or cools down by monitoring the recent heating and cooling history of the home, optionally incorporating external environmental information such as outside temperatures, sun heating effects, etc.; predict how long the HVAC system will need to actively heat or cool in order to reach a particular scheduled setpoint; and begin preconditioning toward the particular scheduled setpoint at just the right time such that the scheduled setpoint temperature will be reached at the scheduled setpoint time. User comfort is promoted by virtue of not reaching the scheduled setpoint temperature too late, while energy savings is promoted by virtue of not reaching the scheduled setpoint temperature too early.

In relation to heating mode operation, if it is determined that the HVAC system includes radiant heating (step 2208), then at step 2218 there is enabled a smart radiant control feature for heating mode operation. One example of a particularly advantageous smart radiant control feature is described herein. For some embodiments, the smart radiant control feature is configured to monitor radiant heating cycles on an ongoing basis, compute an estimated thermal model of the home as heated by the radiant system, and predictively control the radiant system in a manner that takes into account the thermal model of the house, the time of day, and the previous heat cycle information. The smart radiant control feature is configured to achieve comfortable maintenance band temperatures while also minimizing frequent changes in HVAC on/off states and minimizing HVAC energy consumption. Among other advantages, uncomfortable and energy-wasting target temperature overshoots are avoided.

If it is determined that the HVAC system includes a heat pump including auxiliary resistive electrical heating (i.e., so-called auxiliary or AUX heat) (step 2210), and if it is further determined (step 2212) that the thermostat is network-connected (such that it can receive outside temperature information based on location data and an internet-based temperature information source) or otherwise has access to outside temperature information (such as by wired or wireless connection to an outside temperature sensor), then at step 2216 a smart heat pump control feature is enabled. If at step 2210 there is not a heat pump with AUX heat (which will most commonly be because there is a conventional gas furnace instead of a heat pump, or else because there is a heat pump in a so-called dual-fuel system that does not include AUX heat), then at step 2214 there is enabled a smart preconditioning feature for heat mode, which can be a similar or identical opposing counterpart to the preconditioning feature for cooling mode discussed supra with respect to step 2206. Similarly, if at step 2212 there is no network connectivity or other access to outside temperature information, then the smart heat pump control feature of step 2216 is not enabled and instead the smart preconditioning feature of step 2214 is enabled.

In reference to step 2216, one example of a particularly advantageous smart heat pump control feature is described in U.S. Ser. No. 13/632,093, supra. Although the AUX heat function allows for faster heating of the home, which can be particularly useful at lower outside temperatures at which heat pump compressors alone are of lesser efficacy, the energy costs of using AUX heat can often be two to five times as high as the energy costs of using the heat pump alone. For some embodiments, the smart heat pump control feature is configured to monitor heat pump heating cycles on an ongoing basis, tracking how fast the home is heated (for example, in units of degrees F. per hour) by the heat pump compressor alone in view of the associated outside air temperatures. Based on computed correlations between effective heating rates and outside air temperatures, and further including a user preference setting in a range from "Max Comfort" to "Max Savings" (including a "Balanced" selection in between these end points), the smart heat pump control feature judiciously activates the AUX heating function in a manner that achieves an appropriate balance between user comfort and AUX heating costs. For some embodiments, the factors affecting the judicious invocation of AUX heat include (i) a predicted amount of time needed for the heat pump alone to achieve the current temperature setpoint, (ii) whether the current temperature setpoint resulted from an immediate user control input versus whether it was a scheduled temperature setpoint, and (iii) the particular selected user preference within the "Max Comfort" to "Max Savings" range. Generally speaking, the AUX function determination will be more favorable to invoking AUX heat as the compressor-alone time estimate increases, more favorable to invoking AUX heat for immediate user control inputs versus scheduled setpoints, and more favorable to invoking AUX heat for "Max Comfort" directed preferences than for "Max Savings" directed preferences.

For some embodiments, the smart heat pump control feature further provides for automated adjustment of a so-called AUX lockout temperature, which corresponds to an outside air temperature above which the AUX heat will never be turned on, based on the monitored heat pump heating cycle information and the user preference between "Max Comfort" and "Max Savings." Generally speaking, the AUX lockout temperatures will be lower (leading to less AUX usage) for better-performing heat pumps, and will also be lower (leading to less AUX usage) as the user preference tends toward "Max Savings". For some embodiments in which there is network connectivity available such that overnight temperature forecasts can be provided, the smart heat pump control feature further provides for night time temperature economization in which an overnight setpoint temperature may be raised higher than a normally scheduled overnight setpoint if, based on the overnight temperature forecast, the AUX function would be required to reach a morning setpoint temperature from the normal overnight setpoint temperature when morning comes. Advantageously, in such situations, even though the overnight temperature inside the home is made higher it would otherwise be, the user actually saves energy and money by avoiding the use of the AUX function when morning comes.

According to some embodiments, the determinations made at one or more of steps 2208 and 2210 can be based on automatically observed HVAC system performance information rather than specific system identification information. For example, it may be the case that a particular heating functionality of an HVAC system is not physically a radiant system, but nevertheless tends to exhibit signs of a high thermal mass combined with substantial control lag, making it similar in nature to a radiant heating system. For such cases, the smart radiant control feature may be enabled to improve performance. Likewise, it may not be the case that the HVAC system has a heat pump with AUX functionality, but it may have a two-stage heating functionality in which the first stage (which type was likely chosen as a first stage because it was more cost-effective) tends to be very slow or "fall behind" at lower outside temperatures, and in which the second stage (which type was likely chosen as a second stage because it was less cost-effective) tends to be very time-effective in heating up the home, thus making the system act very much like a heat pump system with AUX functionality. For such cases, the smart heat pump control feature may be enabled to improve performance.

Although embodiments of the invention have been generally directed toward controls for HVAC systems, it should be realized that the concepts described herein can be employed to control various other systems or devices. For example, the idea of using historical data to generate predictive controls may be used to control various home appliances or systems. For example, homes fitted with proximity sensors may be used to detect the activity or occupancy level within the home (i.e., how active the home's occupants are throughout the day and in what locations they are active). This activity level data may be recorded and used to generate a predictive model of the home's activity levels. Based on this model the home's appliances may be controlled. For example, the lights in historically less active areas may be dimmed, such as in late evenings when occupants are less active, or the lights may be gradually turned on as the occupants arise in the morning.

This concept may also be applied to control external devices or systems, such as a sprinkler system. For example, rain fall of the surrounding area may be measured and recorded or otherwise obtained, and this data may be compared to charts or graphs showing how much water a typically or average lawn in the area needs. A predictive model may be fit with this data to adjust a sprinkler's watering times and/or volume based on predictive or forecasted rain fall. This data may be also be provided to city or state services to help these services predict or plan for the needs of future homes within the area.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A heating, ventilating, and air conditioning (HVAC) control system comprising:
   a processing system in operative communication with a heating system, the processing system being configured and programmed to control the heating system to:
      acquire historical temperature information regarding heating of an enclosure during at least one historical period in which the enclosure was heated by the heating system under the control of said HVAC control system;
      determine a Lag value that represents at least in part an amount of system inertia for the enclosure;

determine a plurality of candidate heating control strategies based on said historical temperature information;

determine an optimal heating control strategy from said plurality of candidate heating control strategies by computing a plurality of predicted temperature responses corresponding respectively to the plurality of candidate heating control strategies; and control the heating system according to the determined optimal heating control strategy.

2. The HVAC control system of claim 1, wherein the HVAC control system includes a housing and memory, the memory being disposed within the housing and including instructions that program the processing system to perform said steps.

3. The HVAC control system of claim 1, wherein information for said processing system is stored remotely from the HVAC control system.

4. The HVAC control system of claim 1, wherein the processing system includes a first high-powered processor that is configured and programmed to determine the optimal heating control strategy, and wherein the processing system includes a second low-powered processor that is in operative communication with one or more temperature sensors to determine an ambient temperature.

5. The HVAC control system of claim 4, wherein the HVAC control system includes a rechargeable battery and the first processor is configured to transition between a wake state and a sleep state, wherein each time the first processor transitions from the sleep state to the wake state, the optimal heat control strategy is re-determined based at least in part on ambient temperature readings determined by the second processor during the sleep state of the first processor.

6. The HVAC control system of claim 1, wherein said processing system is further configured and programmed to control the heating system to determine a parameterized model from which the plurality of candidate heating control strategies is determined, the parameterized model being based at least in part on the historical temperature information.

7. The HVAC control system of claim 1, wherein a first optimal heat strategy covering a first time period is determined and executed to control the heating system during the first time period, and wherein a second optimal heat control strategy is determined during the first time period and executed prior to an end of the first time period to control the heating system.

8. The HVAC control system of claim 1, wherein said processing system is further configured and programmed to control the heating system to process said predicted temperature responses according to one or more predetermined assessment criteria.

9. A method of controlling a heating, ventilating, and air conditioning (HVAC) control system comprising:

providing a heating, ventilating, and air conditioning (HVAC) control system that includes a processing system in operative communication with a heating system;

acquiring historical temperature information regarding heating of an enclosure during at least one historical period in which the enclosure was heated by the heating system under the control of said HVAC control system;

determining a Lag value that represents at least in part an amount of system inertia for the enclosure;

determining a plurality of candidate heating control strategies based on said historical temperature information;

determining an optimal heating control strategy from said plurality of candidate heating control strategies by computing a plurality of predicted temperature responses corresponding respectively to the plurality of candidate heating control strategies; and controlling the heating system according to the determined optimal heating control strategy.

10. The method of claim 9, wherein information for said processing system is stored remotely from the HVAC control system.

11. The method of claim 9, wherein the processing system includes a first high-powered processor that is configured and programmed to determine the optimal heating control strategy, and wherein the processing system includes a second low-powered processor that is in operative communication with one or more temperature sensors to determine an ambient temperature.

12. The method of claim 11, wherein the HVAC control system includes a rechargeable battery and the first processor is configured to transition between a wake state and a sleep state, wherein each time the first processor transitions from the sleep state to the wake state, the optimal heat control strategy is re-determined based at least in part on ambient temperature readings determined by the second processor during the sleep state of the first processor.

13. The method of claim 9, wherein the method further includes determining a parameterized model from which the plurality of candidate heating control strategies is determined, the parameterized model being based at least in part on the historical temperature information.

14. A computer-program product, tangibly embodied in a non-transitory machine readable storage medium, including instructions configured to cause a data processing apparatus of an HVAC control system to:

acquire historical temperature information regarding heating of an enclosure during at least one historical period in which the enclosure was heated by a heating system under the control of said HVAC control system;

determine a Lag value that represents at least in part an amount of system inertia for the enclosure;

determine a plurality of candidate heating control strategies based on said historical temperature information;

determine an optimal heating control strategy from said plurality of candidate heating control strategies by computing a plurality of predicted temperature responses corresponding respectively to the plurality of candidate heating control strategies; and control the heating system according to the determined optimal heating control strategy.

15. The computer-program product of claim 14, wherein the HVAC control system includes a first high-powered processor that is configured and programmed to determine the optimal heating control strategy, and wherein the HVAC control system includes a second low-powered processor that is in operative communication with one or more temperature sensors to determine an ambient temperature of the enclosure.

16. The computer-program product of claim 15, wherein the HVAC control system includes a rechargeable battery and the first processor is configured to transition between a wake state and a sleep state, wherein each time the first processor transitions from the sleep state to the wake state, the optimal heat control strategy is re-determined based at least in part on ambient temperature readings determined by the second processor during the sleep state of the first processor.

17. The computer-program product of claim 14, wherein the instructions are further configured to cause the data processing apparatus to determine a parameterized model from which the plurality of candidate heating control strategies is determined, the parameterized model being based at least in part on the historical temperature information.

18. The computer-program product of claim 14, wherein the instructions are further configured to cause the data processing apparatus to:
   determine a first optimal heat strategy covering a first time period;
   execute the first optimal heat strategy to control the heating system during the first time period;
   determine a second optimal heat control strategy during the first time period; and
   execute the second optimal heat strategy prior to an end of the first time period to control the heating system.

19. The HVAC control system of claim 1, wherein said determining the optimal heating control strategy is performed pursuant to a determination that such control is desired based on user entry in a user interface of the HVAC control system of a heating control preference.

20. The HVAC control system of claim 1, wherein said determining the optimal heating control strategy is performed pursuant to a determination that such control is desired based on an automated wire insertion detection algorithm.

21. The HVAC control system of claim 1, wherein said determining the optimal heating control strategy is performed pursuant to a determination that such control is desired based on trial runs of the HVAC control system at or near the time of installation of the HVAC control system.

22. The HVAC control system of claim 1, wherein the heating system is a heating system.

23. The method of claim 9, wherein said determining the optimal heating control strategy is performed pursuant to a determination that such control is desired based on user entry in a user interface of the HVAC control system of a heating control preference.

24. The method of claim 9, wherein said determining the optimal heating control strategy is performed pursuant to a determination that such control is desired based on an automated wire insertion detection algorithm.

25. The method of claim 9, wherein said determining the optimal heating control strategy is performed pursuant to a determination that such control is desired based on trial runs of the HVAC control system at or near the time of installation of the HVAC control system.

26. The method of claim 9, wherein the heating system is a radiant heating system.

27. The computer-program product of claim 14, wherein said determining the optimal heating control strategy is performed pursuant to a determination that such control is desired based on user entry in a user interface of the HVAC control system of a heating control preference.

28. The computer-program product of claim 14, wherein said determining the optimal heating control strategy is performed pursuant to a determination that such control is desired based on an automated wire insertion detection algorithm.

29. The computer-program product of claim 14, wherein said determining the optimal heating control strategy is performed pursuant to a determination that such control is desired based on trial runs of the HVAC control system at or near the time of installation of the HVAC control system.

30. The computer-program product of claim 14, wherein the heating system is a radiant heating system.

* * * * *